United States Patent

Yasue et al.

[11] Patent Number: 6,073,071
[45] Date of Patent: *Jun. 6, 2000

[54] APPARATUS FOR CONTROLLING PRESSURE REDUCTION OF FRICTIONAL COUPLING DEVICE TO SHIFT DOWN AUTOMATIC TRANSMISSION OF MOTOR VEHICLE

[75] Inventors: Hideki Yasue, Toyota; Hiromichi Kimura, Okazaki, both of Japan

[73] Assignee: Toyota Jidosha Kabushiki Kaisha, Toyota, Japan

[*] Notice: This patent is subject to a terminal disclaimer.

[21] Appl. No.: 08/872,067

[22] Filed: Jun. 10, 1997

[30] Foreign Application Priority Data

Jun. 11, 1996 [JP] Japan .................................. 8-147747

[51] Int. Cl.[7] .............................. G06F 7/00; G06F 17/00; G06F 19/00
[52] U.S. Cl. ................................ 701/51; 701/64; 701/87; 477/143; 477/154; 477/156
[58] Field of Search ................................. 701/51, 52, 58, 701/59, 64, 66, 87; 477/143, 154, 155, 156, 158, 166

[56] References Cited

U.S. PATENT DOCUMENTS

| 5,079,971 | 1/1992 | Yoshimura et al. .................. 701/66 X |
| 5,393,275 | 2/1995 | Okada et al. .......................... 701/66 X |
| 5,643,135 | 7/1997 | Tabata et al. ........................... 477/154 |
| 5,669,849 | 9/1997 | Tabata et al. ....................... 477/154 X |
| 5,725,454 | 3/1998 | Yasue et al. ............................ 477/155 |
| 5,776,030 | 7/1998 | Minowa et al. ..................... 477/158 X |
| 5,779,594 | 7/1998 | Minowa et al. ......................... 477/156 |
| 5,792,021 | 8/1998 | Minowa et al. ..................... 477/156 X |

FOREIGN PATENT DOCUMENTS 5-157167 6/1993 Japan .

*Primary Examiner*—William A. Cuchlinski, Jr.
*Assistant Examiner*—Gertrude Arthur

[57] ABSTRACT

An apparatus for controlling an automatic transmission of a motor vehicle, wherein a shift-down action of the automatic transmission is achieved with a releasing action of a hydraulically operated frictional coupling device, the apparatus including a rapid pressure reduction device operated upon determination that the shift-down action should be effected, for rapidly reducing a pressure of the frictional coupling device to a predetermined pressure level higher than a critical level at which the frictional coupling device starts slipping, an input torque determining device for determining an input torque of the automatic transmission, or a rate of increase of the input torque, and a rapid pressure reduction amount determining device for determining the predetermined pressure level to which the pressure of the frictional coupling device is reduced, on the basis of the input torque or the rate of increase thereof of the automatic transmission determined by the input torque determining device. The predetermined pressure level is preferably compensated based on a delay time between moments of decision and initiation of the shift-down action.

24 Claims, 22 Drawing Sheets

FIG. 2

| SHIFT LEVER | TRANSMISSION POSITIONS | $C_1$ | $C_2$ | $C_3$ | $B_1$ | $B_2$ | $B_3$ | $F_1$ | $F_2$ |
|---|---|---|---|---|---|---|---|---|---|
| P | | | | | | | ◯ | | |
| R | | | ◯ | | | ◯ | ◯ | | |
| N | | | | | | | ◯ | | |
| D | 1st | ◯ | | | | | ◯ | △ | △ |
| D | 2nd | ◯ | | | ◯ | | ◯ | | △ |
| D | 3rd | ◯ | ◯ | | | | ◯ | | △ |
| D | 4th | ◯ | ◯ | ◯ | | | | | |
| 2 | 1st | ◯ | | | | | ◯ | △ | △ |
| 2 | 2nd | ◯ | | | ◯ | | ◯ | | △ |
| L | 1st | ◯ | | | | ◯ | ◯ | △ | △ |

6,073,071

APPARATUS FOR CONTROLLING PRESSURE REDUCTION OF FRICTIONAL COUPLING DEVICE TO SHIFT DOWN AUTOMATIC TRANSMISSION OF MOTOR VEHICLE

This application is based on Japanese Patent Application Ser. No. 8-147747 filed Jun. 11, 1996, the content of which is incorporated hereinto by reference.

CROSS REFERENCE TO RELATED APPLICATIONS

Not Applicable

BACKGROUND OF THE INVENTION

1. Field of the Invention

The present invention relates in general to an apparatus for controlling an automatic transmission of a motor vehicle, and more particularly to techniques for controlling a hydraulically operated frictional coupling device which is released to achieve a shift-down action of the automatic transmission.

2. Discussion of the Related Art

There is known an automatic transmission for motor vehicle, which is adapted to effect a shift-down action by releasing a certain hydraulically operated frictional coupling device while engaging a one-way clutch, or by releasing the frictional coupling device while engaging another hydraulically operated frictional coupling device. This type of automatic transmission tends to suffer from a shifting shock upon such a shift-down action during acceleration of the vehicle with an accelerator pedal being depressed. Thus, there has been a need to minimize such a shifting shock of the automatic transmission.

An example of a known control apparatus for controlling an automatic transmission of the type described above is disclosed in JP-A-5-157167. However, this control apparatus is not satisfactory in the control of the frictional coupling device which is released to achieve a shift-down action of the automatic transmission. Described more specifically, the control apparatus is not effective enough to prevent a shifting shock of the transmission due to a torque variation during the shift-down action, or tends to cause the shift-down action to require an undesirably long time if the torque to be transmitted through the automatic transmission during the shift-down action is increased in an attempt to reduce the shifting shock. Thus, the known control apparatus does not permit the shift-down action to be achieved in a satisfactory manner.

SUMMARY OF THE INVENTION

It is therefore an object of this invention to provide an apparatus for controlling an automatic transmission of a motor vehicle, which permits a shift-down action of the automatic transmission to be achieved in a satisfactory manner during acceleration of the vehicle.

The above object may be achieved according to a first aspect of the present invention, which provides an apparatus for controlling an automatic transmission of a motor vehicle, wherein a shift-down action of the automatic transmission is achieved with a releasing action of a hydraulically operated frictional coupling device, the apparatus comprising: (a) rapid pressure reduction means for rapidly reducing a pressure of the hydraulically operated frictional coupling device to a predetermined pressure level, upon determination that the shift-down action of the automatic transmission should be effected, the predetermined pressure level being higher than a critical level at which the frictional coupling device starts slipping; (b) input torque determining means for determining an input torque of the automatic transmission; and (c) rapid pressure reduction amount determining means for determining the predetermined pressure level, on the basis of the input torque of the automatic transmission determined by the input torque determining means.

The present apparatus for controlling the automatic transmission is arranged such that upon determination of the shift-down action of the automatic transmission, the pressure of the hydraulically operated frictional coupling device which is released to achieve the shift-down action is first rapidly reduced to the predetermined level, which is determined depending upon the input torque of the automatic transmission. As the pressure of the frictional coupling device is then continuously reduced to release the frictional coupling device, the shift-down action of the automatic transmission is substantially initiated with initiation of a slipping action of the frictional coupling device. Generally, the pressure at which the frictional coupling device starts slipping during the shift-down action varies with the input torque of the automatic transmission. In the present control apparatus, the pressure level to which the pressure of the frictional coupling device is initially reduced at a relatively high rate is determined by the rapid pressure reduction amount determining means, depending upon the input torque of the automatic transmission, so that the determined pressure level is higher by a suitable small amount than the critical level at which the frictional coupling device starts slipping with the specific input torque. In the process of the subsequent continuous reduction of the pressure of the frictional coupling device, the frictional coupling device starts to slip, causing substantial initiation of the shift-down action of the automatic transmission. Since the pressure level to which the pressure of the frictional coupling device is rapidly reduced is determined with the actual input torque being taken into account, the predetermined pressure level would not be excessively higher or lower than the above-indicated critical level, when the automatic transmission is shifted down as a result of an operation of a shift lever from a drive position to a low-speed position, or as a result of a change in the road surface gradient and/or the currently required output of the vehicle (as represented by the throttle opening angle, for example). The shift-down action requires an unnecessarily long time if the predetermined pressure level to which the pressure of the frictional coupling device is rapidly reduced is excessively high, and suffers from a considerable shifting shock if the predetermined pressure level is excessively low. Therefore, the present control apparatus permits the shift-down action of the automatic transmission to be achieved in a comparatively short time and with a reduced shifting shock.

The object indicated above may also be achieved according to a second aspect of this invention, which provides an apparatus for controlling an automatic transmission of a motor vehicle, wherein a shift-down action of the automatic transmission is achieved with a releasing action of a hydraulically operated frictional coupling device, the apparatus comprising: (a) rapid pressure reduction means for rapidly reducing a pressure of the hydraulically operated frictional coupling device to a predetermined pressure level, upon determination that the shift-down action of the automatic transmission should be effected, the predetermined pressure level being higher than a critical level at which the frictional coupling device starts slipping; (b) input torque change rate determining means for determining a rate of increase of an input torque of the automatic transmission; and (c) rapid pressure reduction amount determining means for determining the predetermined pressure level, on the basis of the rate of increase of the input torque of the automatic transmission determined by the input torque change rate determining means.

The control apparatus according to the second aspect of the present invention is arranged such that the pressure of the hydraulically operated frictional coupling device which is released to achieve the shift-down action of the automatic transmission is first rapidly reduced to the predetermined level which is determined depending upon the rate of increase of the input torque of the automatic transmission. As the pressure of the frictional coupling device is then continuously reduced to release the frictional coupling device, the shift-down action of the automatic transmission is substantially initiated with initiation of a slipping action of the frictional coupling device. Generally, the rate of increase of the input torque of the automatic transmission or the opening angle of a throttle valve is high when the accelerator pedal is depressed by the vehicle operator abruptly or to fully open the throttle valve, for shifting down the automatic transmission to accelerate the vehicle at a relatively high rate. In this case, the vehicle operator usually requires the automatic transmission to exhibit a high response to the operator's manipulation of the accelerator pedal, rather than smoothness of the shift-down action with a reduced shifting shock. The present control apparatus is suitable for meeting this requirement, since the pressure level to which the pressure of the hydraulically operated frictional coupling device is initially rapidly reduced is determined depending upon the rate of increase of the input torque of the automatic transmission, more specifically, the pressure level decreases with an increase of the rate of increase of the input torque, so that the shift-down action is initiated in a relatively short time after the moment of decision to achieve the shift-down action. Thus, the present control apparatus assures a sufficiently high response of the automatic transmission to the operator's depression of the accelerator pedal.

The object indicated above may also be achieved according to a third aspect of this invention, which provides an apparatus for controlling an automatic transmission of a motor vehicle, wherein a shift-down action of the automatic transmission is achieved with a releasing action of a hydraulically operated frictional coupling device, the apparatus comprising: (a) rapid pressure reduction means for rapidly reducing a pressure of the hydraulically. operated frictional coupling device to a predetermined pressure level, upon determination that the shift-down action of the automatic transmission should be effected, the predetermined pressure level being higher than a critical level at which the frictional coupling device starts slipping; (b) delay time determining means for determining a delay time between a moment of the determination that the shift-down action of the automatic transmission should be effected, and a moment of initiation of the shift-down action; and (c) learning compensation means for effecting learning compensation of the predetermined pressure level determined by the rapid pressure reduction amount determining means, such that the delay time determined by the delay time determining means coincides with a predetermined target value.

The control apparatus according to this third aspect of the invention is arranged such that the pressure level determined by the rapid pressure reduction amount determining means is changed by learning compensation by the learning compensation means so that the actual delay time determined by the delay time determining means coincides with the predetermined target value. In the present arrangement, therefore, the delay time from the moment of determination to achieve the shift-down action of the automatic transmission to the moment of substantial initiation of the shift-down action (initiation of slipping of the frictional coupling device) can coincide with the target value, with high accuracy, irrespective of a change in the temperature of the working oil used for the automatic transmission, or a chronological change in the operating characteristic of the frictional coupling device. The present arrangement is effective to minimize the shifting shock of the automatic transmission and prevent its deterioration of the shifting response, permitting the shift-down action to be achieved in an adequate manner.

The object indicated above may also be achieved according to a fourth aspect of this invention, which provides an apparatus for controlling an automatic transmission of a motor vehicle, wherein a shift-down action of the automatic transmission is achieved with a releasing action of a hydraulically operated frictional coupling device, the apparatus comprising: (a) rapid pressure reduction means for rapidly reducing a pressure of the hydraulically operated frictional coupling device to a predetermined pressure level, upon determination that the shift-down action of the automatic transmission should be effected, the predetermined pressure level being higher than a critical level at which the frictional coupling device starts slipping; (b) first continuous pressure reduction means for continuously reducing the pressure of the frictional coupling device from the predetermined level at a first reduction rate; (c) shift-down action initiation monitoring means for determining whether the frictional coupling device has started slipping, and determining that the shift-down action of the automatic transmission has been initiated, when the shift-down action initiation monitoring means determines that the frictional coupling device has started slipping; and (d) second continuous pressure reduction means, operable upon determination of initiation of the shift-down action by the shift-down action initiation monitoring means, for continuously reducing the pressure of the frictional coupling device at a second reduction rate which is lower than the first reduction rate.

The control apparatus according to this fourth aspect of the invention is arranged such that upon determination to shift-down the automatic transmission, the pressure of the hydraulically operated frictional coupling device is rapidly reduced by the rapid pressure reduction means to the predetermined pressure level which is suitably determined to be higher than a critical level at which the frictional coupling device starts slipping. The pressure of the frictional coupling device is then continuously reduced by the first continuous pressure reduction means, at the predetermined first reduction rate until the shift-down action initiation monitoring means determines that the shift-down action has been initiated. After the determination that the shift-down action has been initiated, the pressure of the frictional coupling device is continuously reduced by the second continuous pressure reduction means, at the predetermined second reduction rate lower than the first reduction rate. Thus, the rate at which the pressure of the frictional coupling device is continuously reduced is lowered from the first reduction rate to the second reduction rate upon initiation of the shift-down action of the automatic transmission, so as to minimize the shifting shock of the automatic transmission. The present control apparatus including the rapid pressure reduction means and the first and second continuous pressure reduction means is not only capable of shortening a delay time from the moment of determination to effect the shift-down action to the moment of the initiation of the shift-down action, owing to the rapid reduction of the pressure by the rapid pressure reduction means, but also capable of reducing the shifting shock of the automatic transmission owing to a decrease in the rate of continuous reduction of the pressure from the first reduction rate to the second reduction rate upon detection or determination of the initiation of the shift-down action. In a power transmission system wherein the automatic transmission is controlled by the present control apparatus, the delay time is shorter, and the shifting shock is smaller, than in a power transmission system wherein the automatic transmission is controlled by a control apparatus adapted to reduce the pressure of the frictional coupling device at a constant rate during the shift-down action.

The object indicated above may also be achieved according to a fifth aspect of this invention, which provides an apparatus for controlling an automatic transmission of a motor vehicle, wherein a shift-down action of the automatic transmission is achieved with a releasing action of a hydraulically operated frictional coupling device, the apparatus comprising: (a) rapid pressure reduction means for rapidly reducing a pressure of the hydraulically operated frictional coupling device to a predetermined pressure level, upon determination that the shift-down action of the automatic transmission should be effected, the predetermined pressure level being higher than a critical level at which the frictional coupling device starts slipping; (b) first continuous pressure reduction means for continuously reducing the pressure of the frictional coupling device from the predetermined level at a first reduction rate; (c) shift-down action initiation monitoring means for determining whether the frictional coupling device has started slipping, and determining that the shift-down action of the automatic transmission has been initiated, when the shift-down action initiation monitoring means determines that the frictional coupling device has started slipping; (d) second continuous pressure reduction means, operable upon determination of initiation of the shift-down action by the shift-down action initiation monitoring means, for continuously reducing the pressure of the frictional coupling device at a second reduction rate which is lower than the first reduction rate; (e) terminal shift-down phase monitoring means for determining a terminal phase of the shift-down action of the automatic transmission; and (f) third continuous pressure reduction means, operable upon determination of the terminal phase of the shift-down action by the terminal shift-down phase monitoring means, for continuously reducing the pressure of the frictional coupling device at a third reduction rate lower than said second reduction rate.

The control apparatus according to this fifth aspect of the invention is arranged such that upon determination to shift-down the automatic transmission, the pressure of the hydraulically operated frictional coupling device is rapidly reduced by the rapid pressure reduction means to the predetermined pressure level which is suitably determined to be higher than a critical level at which the frictional coupling device starts slipping. The pressure of the frictional coupling device is then continuously reduced by the first continuous pressure reduction means, at the predetermined first reduction rate until the shift-down action initiation monitoring means determines that the shift-down action has been initiated. After the determination that the shift-down action has been initiated, the pressure of the frictional coupling device is continuously reduced by the second continuous pressure reduction means, at the predetermined second reduction rate lower than the first reduction rate. After the determination of the terminal phase of the shift-down action by the terminal shift-down phase monitoring means, the pressure of the frictional coupling device is continuously reduced by the third continuous pressure reduction means, at the predetermined third reduction rate lower than the second reduction rate. Thus, the rate at which the pressure of the frictional coupling device is continuously reduced is lowered from the first reduction rate to the second reduction rate upon initiation of the shift-down action of the automatic transmission, and from the second reduction rate to the third reduction rate upon detection of the terminal phase of the shift-down action, so as to minimize the shifting shock of the automatic transmission due to a change in the torque. The present control apparatus including the rapid pressure reduction means and the first, second and third continuous pressure reduction means is not only capable of shortening a delay time from the moment of determination to effect the shift-down action to the moment of the initiation of the shift-down action, owing to the rapid reduction of the pressure by the rapid pressure reduction means, but also capable of reducing the shifting shock of the automatic transmission owing to a decrease in the rate of continuous reduction of the pressure from the first reduction rate to the second reduction rate upon detection or determination of the initiation of the shift-down action, and from the second reduction rate to the third reduction rate upon detection of the terminal phase of the shift-down action. In a power transmission system wherein the automatic transmission is controlled by the present control apparatus, the delay time is shorter, and the shifting shock is smaller, than in a power transmission system wherein the automatic transmission is controlled by a control apparatus adapted to reduce the pressure of the frictional coupling device at a constant rate during the shift-down action.

In one preferred form of the fourth or fifth aspect of this invention, the control apparatus further comprises shift-down action completion monitoring means for determining whether said shift-down action of said automatic transmission is completed, and fully releasing means, operable when said shift-down action completion monitoring means determines that said shift-down action is completed, for terminating continuous reduction of the pressure of said frictional coupling device by said second or third continuous pressure reduction means, and reducing the pressure of said frictional coupling device to an atmospheric pressure.

In one preferred form of the fifth aspect of this invention, the shift-down action of the automatic transmission is achieved by the releasing action of the hydraulically operated frictional coupling device and an engaging action of another hydraulically operated frictional coupling device, and the apparatus further comprises rapid pressure increase means for rapidly increasing the pressure of the above-indicated another frictional coupling device when the terminal shift-down phase monitoring means determines the terminal phase of the shift-down action. This preferred form of the control apparatus permits the engaging action of the above-indicated another frictional coupling device to be completed at an adequate point of time.

In one advantageous arrangement of the above preferred form of the fifth aspect of the invention, the terminal shift-down phase monitoring means determines the terminal phase when an input speed of the automatic transmission has increased to a predetermined reference speed, and the apparatus further comprises: input speed change rate determining means for determining a rate of change of the input speed of the automatic transmission in the terminal phase of the shift-down action; and reference speed learning compensation means for effecting learning compensation of the reference speed on the basis of the rate of change of the input speed determined by the input speed change rate determining means. In this preferred form of the apparatus, the reference speed used for determining the terminal phase of the shift-down action is compensated on the basis of the determined rate of change of the input speed of the automatic transmission in the terminal phase of the shift-down action, so that the shift-down action is not influenced by a chronological change of the operating characteristics of the above-indicated another frictional coupling device and a change in the temperature of the working oil used for the automatic transmission. This arrangement assures a smooth increase of the torque of the automatic transmission in the terminal phase of the shift-down action, up to the desired value upon and after completion of the shift-down action, thereby making it possible to minimize the shifting shock of the automatic transmission.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 2 is a view indicating combinations of operating states of clutches and brakes for establishing respective operating positions of the automatic transmission of FIG. 1;

DETAILED DESCRIPTION OF THE PRFERRED EMBODIMENTS

Figure 1:
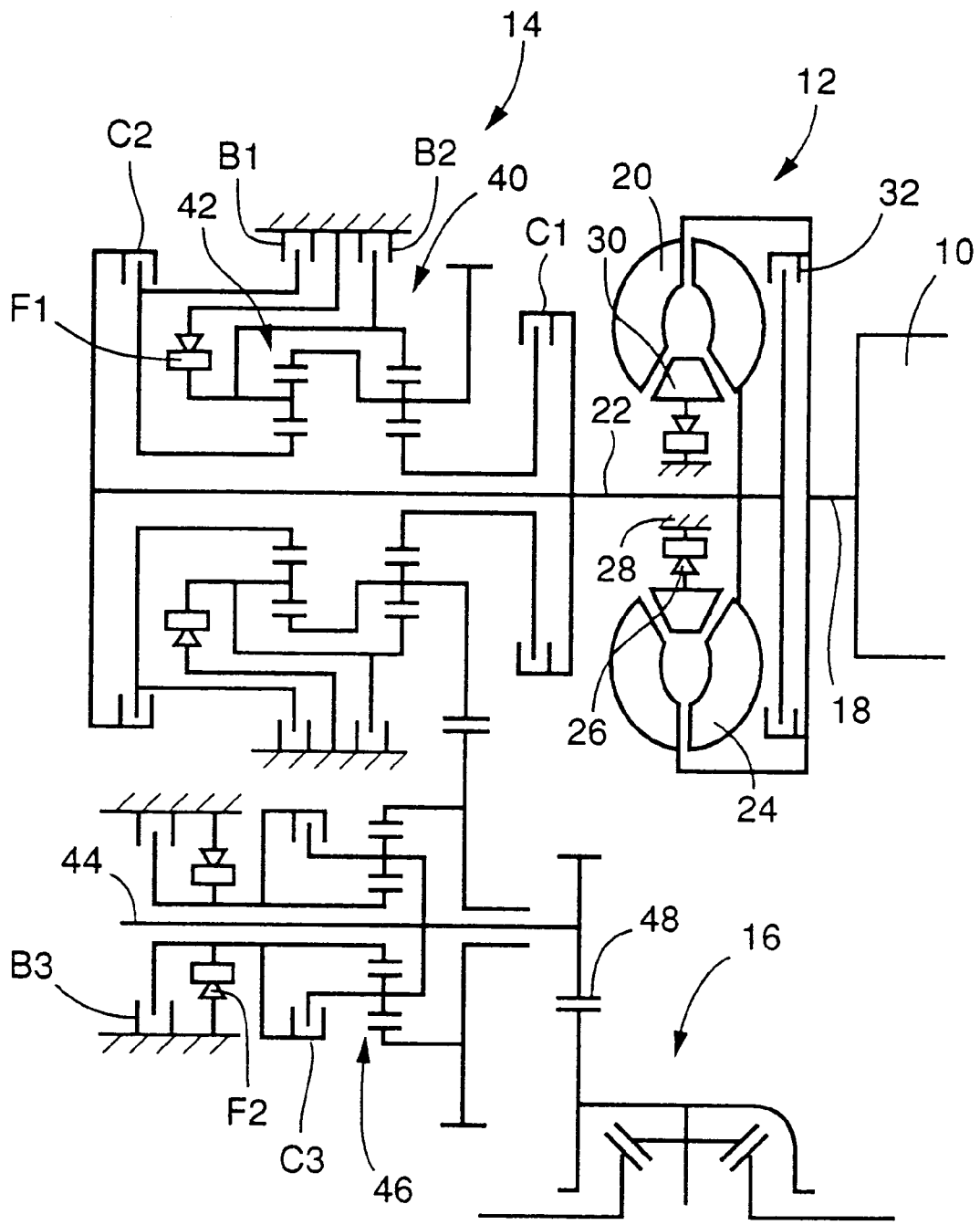
FIG. 1 is a schematic view showing a power transmitting system of a motor vehicle including an automatic transmission to which the present invention is applicable.

Referring first to FIG. 1, there is shown a power transmitting system of a motor vehicle, wherein an output of an engine 10 is transmitted to drive wheels of the vehicle through a fluid-operated power transmitting device in the form of a torque converter 12, an automatic transmission 14, and a differential gear device 16. The torque converter 12 includes a pump impeller 20 connected to a crankshaft 18 of the engine 10, a turbine impeller 24 connected to an input shaft 22 of the automatic transmission 14, a stator impeller 30 fixed through a one-way clutch 26 to a stationary member in the form of a housing 28, and a lock-up clutch 32 connected through a suitable damper to the input shaft 22.

The automatic transmission 14 includes: two single-pinion type planetary gear sets 40, 42 disposed coaxially with the input shaft 22; a planetary gear set 46 disposed coaxially with a counter shaft 44 which is parallel to the input shaft 22; and an output gear 48 which is fixed to an end of the counter shaft 44 and which meshes with the differential gear device 16. Elements of the planetary gear sets 40, 42, 46 are selectively connected to each other by selective engagement of three clutches C1, C2, C3, and are selectively fixedly connected to the housing 28 by selective engagement of three brakes B1, B2, B3. Further, the elements of the planetary gear sets 40, 42, 46 are selectively connected to each other or fixedly connected to the housing 28, through two one-way clutches F1, F2, depending upon the directions of rotation of those elements. Since the differential gear device 16 is symmetrical with respect to its axis (drive axle of the vehicle), only a half (an upper half) of the device 16 is shown in FIG. 1.

The clutches C1, C2, C3 and brakes B1, B2, B3 (which will be generally referred to as "clutches C and brakes B", where appropriate) are frictional coupling devices such as multiple-disc clutches and band-brakes, which are engaged by suitable hydraulic actuators. The automatic transmission 14 has four forward-drive positions "1st", "2nd", "3rd" and "4th", as indicated in FIG. 2. With the clutches C and brakes B selectively engaged by the respective hydraulic actuators, a selected one of the four forward-drive positions of the automatic transmission 14 is established. In FIG. 2, "o" represents engaged states of the clutches C and brakes B, and ""Δ" represent engaged states of the one-way clutches F1, F2 only when a drive torque is transmitted in the forward direction from the engine 10 toward the drive wheel. The one-way clutches F1, F2 are not engaged when the appropriate operating positions of the automatic transmission 14 are established with an engine brake being applied to the vehicle. It will also be noted that the absence of the symbols "o" and "Δ" indicates released states of the clutches C, brakes B and one-way clutches F1, F2.

Figure 3:
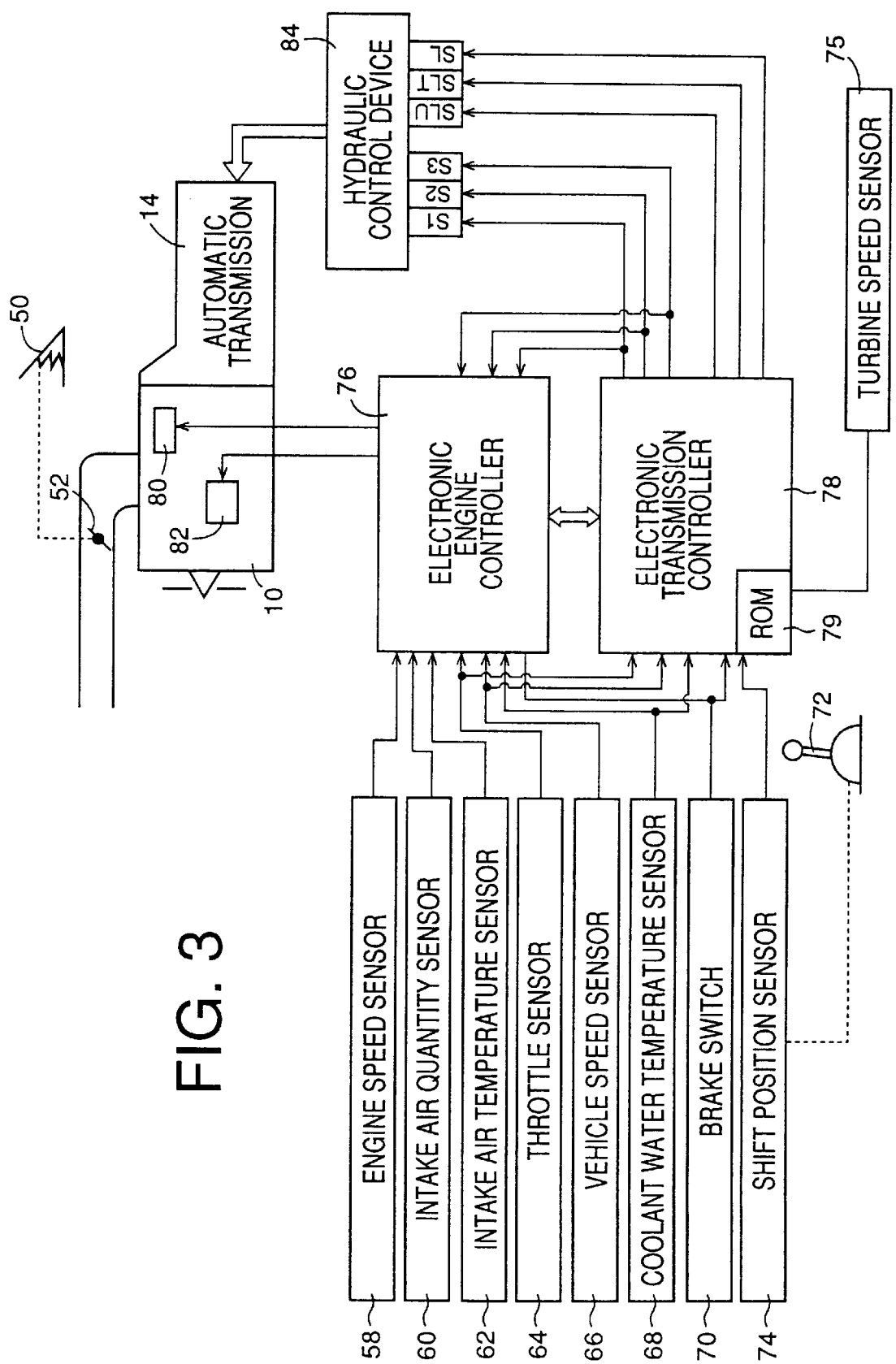
FIG. 3 is a block diagram illustrating a control system for the automatic transmission, including an electronic transmission controller constructed according to one embodiment of this invention for controlling the automatic transmission of FIG. 1.

The engine 10 and the automatic transmission 14 are controlled by a control system shown in FIG. 3, wherein a throttle valve 52 is disposed in an intake pipe of the engine 10. The throttle valve 52 is operatively linked with an accelerator pedal 50. The control system includes an electronic engine controller 76 and an electronic transmission controller 78 which are connected to each other. The engine controller 76 is adapted to receive output signals of an engine speed sensor 58, an intake air quantity sensor 60, an intake air temperature sensor 62, a throttle sensor 64, a vehicle speed sensor 66, a coolant water temperature sensor 68 and a BRAKE switch 70, while the transmission controller 78 is adapted to receive the output signals of the sensors 64, 66, 68 and BRAKE switch 70, and an output signal of a shift position sensor 74. The output signal of the engine speed sensor 58 represents a speed $N_E$ of the engine 10. The output signal of the intake air quantity sensor 70 represents an intake air quantity Q of the engine 10. The output signal of the intake air temperature sensor 62 represents a temperature $T_A$ of the intake air of the engine 10. The output signal of the throttle valve 52 represents an opening angle θ of the throttle valve 52. The output signal of the vehicle speed sensor 66 represents a rotating speed $N_{OUT}$ of the counter shaft 44, which can be used to calculate a running speed V of the motor vehicle. The output signal of the coolant water temperature sensor 68 represents a temperature $T_W$ of a coolant water of the engine 10. The output signal of the BRAKE switch 70 indicates an operating state of a brake pedal (not shown). The output signal of the shift position sensor 74 represents a currently selected or established position of a shift lever 72. The transmission controller 78 also receives an output signal of a turbine speed sensor 74 representative of a rotating speed $N_T$ of the turbine impeller 24, that is, a rotating speed $N_{IN}$ of the input shaft 22 of the automatic transmission 14. The speed $N_{IN}$ will be referred to as "input speed of the automatic transmission 14" where appropriate.

The engine controller 76 is a so-called microcomputer incorporating a central processing unit (CPU), a random-access memory (RAN), a read-only memory (ROM), and an input and output interface. The CPU of the engine controller 76 operates according to control programs stored in the ROM while utilizing a temporary data storage function of the RAM, to process the received output signals of the sensors indicated above, for effecting various control operations to control the engine 10, such as an operation to control a fuel injector valve 80 for controlling an amount of injection of a fuel, an operation to control an ignitor 82 for controlling the ignition timing of the engine 10, and an operation to control a well known by-pass valve for controlling an idling speed of the engine 10.

The transmission controller 78 is also a microcomputer similar to that of the engine controller 76. A CPU of the microcomputer of the transmission controller 78 is also adapted to operate according to control programs stored in a ROM 79 while utilizing a temporary data storage function of a RAM, to process the received output signals of the sensors, for controlling various solenoid-operated valves S1, S2, S3, SL and linear solenoid valves SLU, SLT used in a hydraulic control device 84 for the automatic transmission 14. For instance, the transmission controller 78 controls the linear solenoid valve SLT so as to generate an output pressure $P_{SLT}$ corresponding to the opening angle θ of the throttle valve 52, controls the linear solenoid valve SLU so as to control an amount of slip $N_{SLIP}$ of the lock-up clutch 32, and controls the solenoid-operated valve SL for selectively engaging and releasing the lock-up clutch 32. The transmission controller 78 is further adapted to determine whether the automatic transmission 14 should be shifted up or down from the currently established position to another position, on the basis of the detected opening angle θ of the throttle valve 52 and running speed V of the vehicle, and according to predetermined shift patterns, and whether the lock-up clutch 32 should be engaged or released. According to results of these determinations, the transmission controller 78 controls the solenoid-operated valves S1, S2, S3 so as to shift the automatic transmission 14 and controls the operating state of the lock-up clutch 24.

Figure 4:
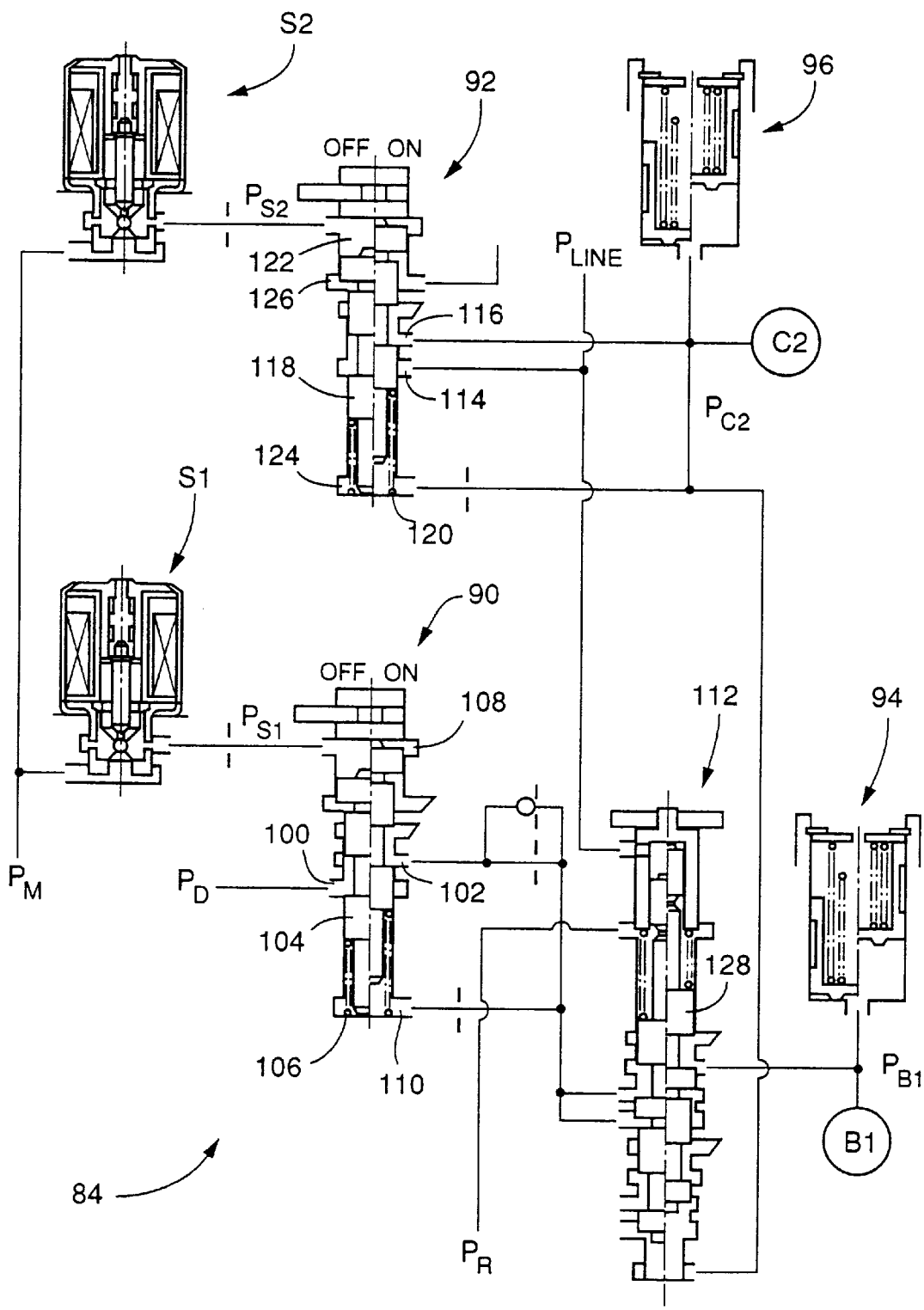
FIG. 4 is a view showing a part of a hydraulic control device for the automatic transmission, which device is shown in FIG. 3.

Referring to FIG. 4, there are shown components of the hydraulic control device 84, which control the engaging and releasing actions of the brake B1 and clutch C2 used to establish the second-speed and third-speed positions "2nd" and "3rd" of the automatic transmission 14. In the hydraulic control device 84, the solenoid-operated valves S1 and S2 receive a MODULATOR PRESSURE $P_M$ which is obtained by regulating a line pressure $P_{LINE}$. These solenoid-operated valves S1, S2 are controlled according to drive signals received from the transmission controller 78. The drive signals indicate duty ratios of the valves S1, S2, namely, drive currents $I_{S1}$ and $I_{S2}$ for energizing the solenoid coils of the valves S1, S2. The valves S1, S2 generate control pressures $P_{S1}$ and $P_{S2}$ corresponding to the amounts of the received drive currents $I_{S1}$, $I_{S2}$. The control pressures $P_{S1}$, $P_{S2}$ are applied to a B1 pressure regulating valve 90 and a C2 pressure regulating valve 92, respectively, so that pressures $P_{B1}$ and $P_{C1}$ are applied to the brake B1 and the clutch C2, respectively. To the brake B1 and clutch C2, there are connected a B1 damper 94 and a C2 damper 96, respectively, for absorbing pulsation of the pressures $P_{B1}$, $P_{C2}$.

The B1 pressure regulating valve 90 has: an input port 100 for receiving a FORWARD DRIVE pressure $P_D$ which is generated from a manual valve when the shift lever 72 is operated to one of forward-drive positions such as DRIVE position "D", SECOND position "2" and LOW position "L"; an output port 102 through which the pressure $P_{B1}$ is applied to the brake B1; a spool 104 for connecting and disconnecting the input and output ports 100, 102 to and from each other; a spring 106 for biasing the spool 104 in a valve-closing direction for disconnecting the input and output ports 100, 102; an oil chamber 108 adapted to receive the control pressure $P_{S1}$ which biases the spool 104 in a valve-opening direction for connecting the input and output ports 100, 102; and a feedback oil chamber 110 accommodating the spring 106 and adapted to receive the pressure $P_{B1}$ as a feedback pressure which biases the spool 104 in the valve-closing direction. The B1 pressure regulating valve 90 regulates the pressure $P_{B1}$ on the basis of the control pressure $P_{S1}$, according to the following equation (1):

$$P_{B1}=(S1 \cdot P_{S1}-W1)/S2 \qquad \ldots (1)$$

In the above equation (1), "S1" and "S2" represent a pressure-receiving area of the oil chamber 108 and a pressure-receiving area of the feedback oil chamber 110, while "W1" represents a biasing-force of the spring 106. The pressure-receiving area S1 is larger than the pressure-receiving area S2.

The thus regulated pressure $P_{B1}$ is applied to the brake B1 through a fail-safe valve 112.

The C2 pressure regulating valve 92 has: an input port 114 adapted to receive the line pressure $P_{LINE}$; an output port 116 through which the pressure $P_{C2}$ is applied to the clutch C2; a spool 118 for connecting and disconnecting the input and output ports 114, 116 to and from each other; a spring 120 for biasing the spool 118 in a valve-closing direction for disconnecting the input and output ports 114, 116 from each other; an oil chamber 122 adapted to receive the control pressure $P_{S2}$ which biases the spool 118 in a valve-opening direction for connecting the input and output ports 114, 116; a feedback oil chamber 124 accommodating the spring 120 and adapted to receive the pressure $P_{C2}$ as a feedback pressure which biases the spool 118 in the valve-closing direction; and an oil chamber 126 adapted to receive a LOW POSITION pressure $P_L$ which is generated upon operation of the shift lever 72 to the LOW position "L" and which acts to hold the spool 118 in the closed position. The C2 pressure regulating valve 92 regulates the pressure $P_{C2}$ on the basis of the control pressure $P_{S2}$, according to the following equation (2):

$$P_{C2}=(S3 \cdot P_{S2}-W2)/S4 \qquad \ldots (2)$$

In the above equation (2), "S3" and "S4" represent a pressure-receiving area of the oil chamber 122 and a pressure-receiving area of the feedback oil chamber 124, while "W2" represents a biasing force of the spring 120. The pressure-receiving area S3 is larger than the pressure-receiving area S4.

The thus regulated pressure $P_{C1}$ is applied to the brake C2.

The fail-safe valve 112 is provided to protect the brakes B1, B2 upon simultaneous generation of the pressure $P_{C2}$ for the clutch C2, the pressures $P_{B1}$ and $P_{B2}$ for the brakes B1, B2. In the event the pressure $P_{C2}$ is raised simultaneously with the pressure $P_{B1}$ or $P_{B2}$, a spool 128 of the fail-safe valve 112 is moved up as seen in FIG. 4, so as to cut the pressure $P_{B1}$ for the brake B1 or the pressure $P_{B2}$ for the brake B2.

Referring next to the block diagram of FIG. 5, there will be described the functions of the various functional means of the electronic transmission controller 78. This transmission controller 78 includes releasing pressure control means 130, shift-down action initiation monitoring means 136, input torque determining means 144, rapid pressure reduction amount determining means 146 and shift-down action completion monitoring means 150.

Figure 6:
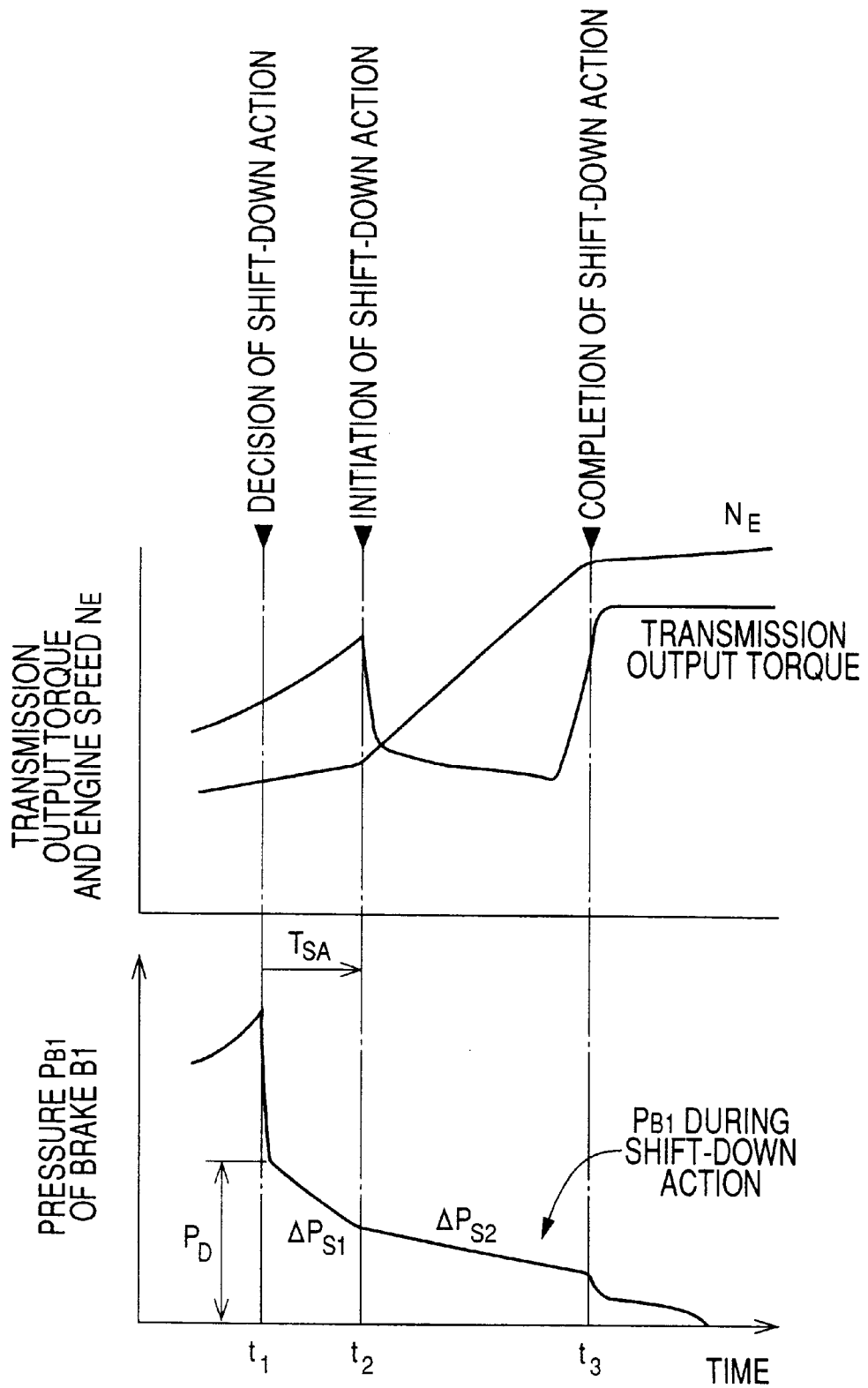
FIG. 6 is a time chart indicating changes of an engine speed $N_E$ (=$N_T$), an output torque $T_{OUT}$ of the automatic transmission and an engaging pressure $P_{B1}$ of brake B1, when the engaging pressure $P_{B1}$ is controlled by the transmission controller whose functional means are illustrated in FIG. 5.

The releasing pressure control means 130 is adapted to adapted to control the pressure $P_{B1}$ of the brake B1 upon a 2–1 shift-down action of the automatic transmission 14 from the second-speed position "2nd" to the first-speed position "1st", during acceleration of the vehicle with the accelerator pedal 50 being in a depressed state. To achieve the 2–1 shift-down action, the brake B1 provided as a frictional coupling device for shifting the automatic transmission 14 is released, as indicated in FIG. 2. This shift-down action with the accelerator pedal 50 in the depressed state is referred to as "ACCELERATOR-ON" 2–1 shift-down action. The releasing pressure control means 130 controls the pressure $P_{B1}$ of the brake B1, as indicated in FIG. 6 by way of example, so as to permit the ACCELERATOR-ON 2–1 shift-down action to be achieved in a smooth manner without a shifting shock of the automatic transmission 14.

The releasing pressure control means 130 incorporates rapid pressure reduction means 132, first continuous pressure reduction means 134, and second continuous pressure reduction means 138, fully releasing means 142.

The rapid pressure reduction means 132 is adapted to rapidly reduce the pressure $P_{B1}$ to a predetermined level $P_D$ at which the brake B1 does not slip. The first continuous pressure reduction means 134 is adapted to continuously reduce the pressure $P_{B1}$ from the level $P_D$ at a first reduction rate $\Delta P_{S1}$. The shift-down action initiation monitoring means 136 is adapted to determine whether the 2–1 shift-down action of the automatic transmission 14 has been initiated. This determination is effected by determining whether the brake B1 has started slipping. The second continuous pressure reduction means 138 is adapted to reduce the pressure $P_{B1}$ at a second reduction rate $\Delta P_{S2}$ lower than the first reduction rate $\Delta P_{S2}$, after the shift-down action initiation monitoring means 136 has determined that the 2–1 shift-down action has been initiated. The fully releasing means 142 is adapted to fully release the brake B1 by holding the pressure $P_{B1}$ at the atmospheric pressure, after completion of the 2–1 shift-down action.

Figure 7:
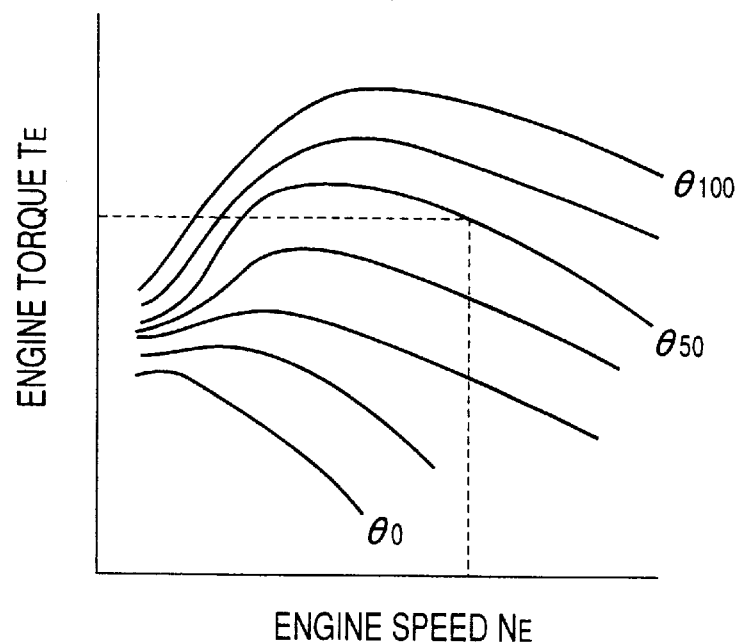
FIG. 7 is a view indicating relationships used by input torque determining means of FIG. 5 for determining engine torque.
Figure 8:
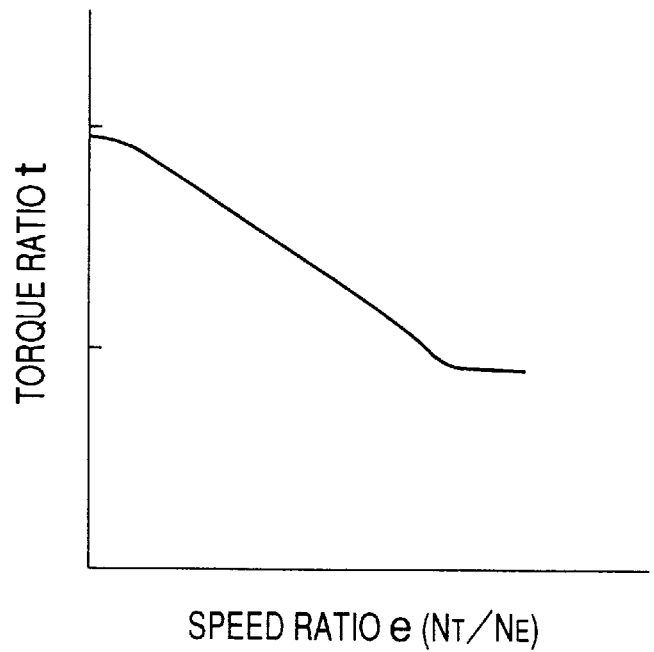
FIG. 8 is a view indicating a relationship used by the input torque determining means of FIG. 5 for determining a torque ratio t of a torque converter.

The input torque determining means 144 is adapted to determine an input torque $T_I$ of the automatic transmission 14, namely, a torque $T_I$ of the input shaft 22. Described in detail, the input torque determining means 144 first determines an output torque $T_E$ of the engine 10 on the basis of the detected engine speed $N_E$ and throttle opening angle θ, and according to a stored predetermined relationship of the output torque $T_E$ with the engine speed $N_E$ and throttle opening angle θ. An example of this relationship is indicated in the graph of FIG. 7 by way of example. Then, the input torque determining means 144 determines a torque ratio or boosting ratio "t" of the torque converter 12, on the basis of a speed ratio "e"=$N_T/N_E$ of the detected speed $N_T$ of the turbine impeller 24 and the detected speed $N_E$ of the engine 10 (pump impeller 20), and according to a stored predetermined relationship between the torque ratio "t" and the speed ratio "e". An example of this relationship is indicated in the graph of FIG. 8 by way of example. The input torque determining means 144 determines the input torque $T_I$ of the automatic transmission 14 on the basis of the engine output torque $T_E$ and the torque ratio "t".

Figure 9:
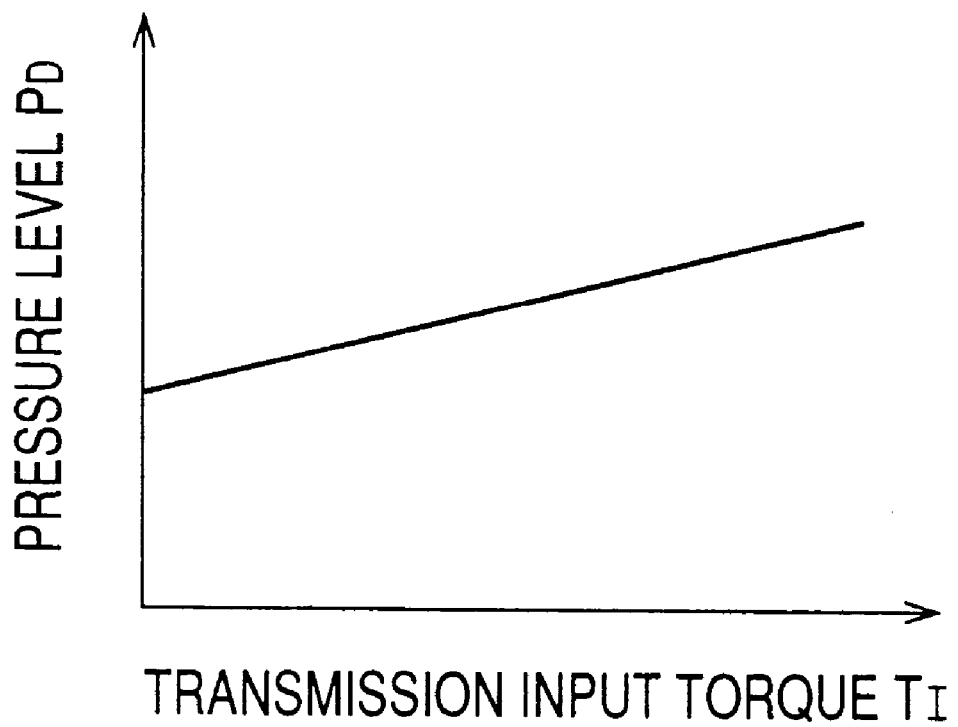
FIG. 9 is a view used by rapid pressure reduction amount determining means of FIG. 5 for determining a rapid pressure reduction amount $P_D$.

The rapid pressure reduction amount determining means 146 is adapted to determine the pressure level $P_D$ to which the pressure $P_{B1}$ is reduced by the rapid pressure reduction means 132. The determining means 146 determines the pressure level $P_D$ on the basis of the input torque $T_I$ of the automatic transmission 14 determined by the input torque determining means 144, and according to a stored predetermined relationship between the pressure level $P_D$ and the input torque $T_I$. An example of this relationship is indicated in the graph of FIG. 9 by way of example. The relationship of FIG. 9 is formulated such that the pressure level $P_D$ linearly increases with an increase in the input torque $T_I$, according to an equation $P_D = A \times T_I \times B$, and such that the pressure level $P_D$ is higher by a predetermined amount than a level at which the brake B1 starts slipping, in other words, such that the brake B1 is about to slip but is not slipping at the pressure level $P_D$.

The shift-down action initiation monitoring means 136 is adapted to detect a point of time at which the input speed $N_T$ of the automatic transmission 14 (speed $N_T$ of the turbine impeller 24) begins to increase after the automatic transmission 14 is commanded to effect the 2–1 shift-down action (after the transmission controller 78 has determined that the automatic transmission 14 should be shifted down from the second-speed position "2nd" to the first-speed position "1st"). The above-indicated point of time, which indicates substantial initiation of the 2–1 shift-down action, may be detected by detecting the initiation of slipping of the brake B1. When the substantial initiation of the 2–1 shift-down action is detected by the monitoring means 136, the pressure $P_{B1}$ which has been continuously reduced at the first reduction rate $\Delta P_{S1}$ is then continuously reduced by the second continuous pressure reduction means 138 at the second reduction rate $\Delta P_{S2}$ which is lower than the first reduction rate $\Delta P_{S1}$. The pressure reduction rates $\Delta P_{S1}$, $\Delta P_{S2}$ may be represented by amounts of reduction of the pressure $P_{B1}$ in a predetermined time period such as a few milliseconds.

The shift-down action completion monitoring means 150 detects the completion or termination of the 2–1 shift-down action when the input speed $N_T$ of the automatic transmission 14 (which is equal to the speed $N_T$ of the turbine impeller 24) has become equal to a product ($\rho_{1ST} \times N_{OUT}$) of the output speed $N_{OUT}$ of the automatic transmission 14 and a speed ratio $\rho_{1ST}$ of the first-speed position "1st" of the automatic transmission 14. The fully releasing means 142 fully releases the brake B1 with the pressure $P_{B1}$ being equal to the atmospheric pressure, when the completion of the 2–1 shift-down action is detected by the shift-down action completion monitoring means.

Figure 10:
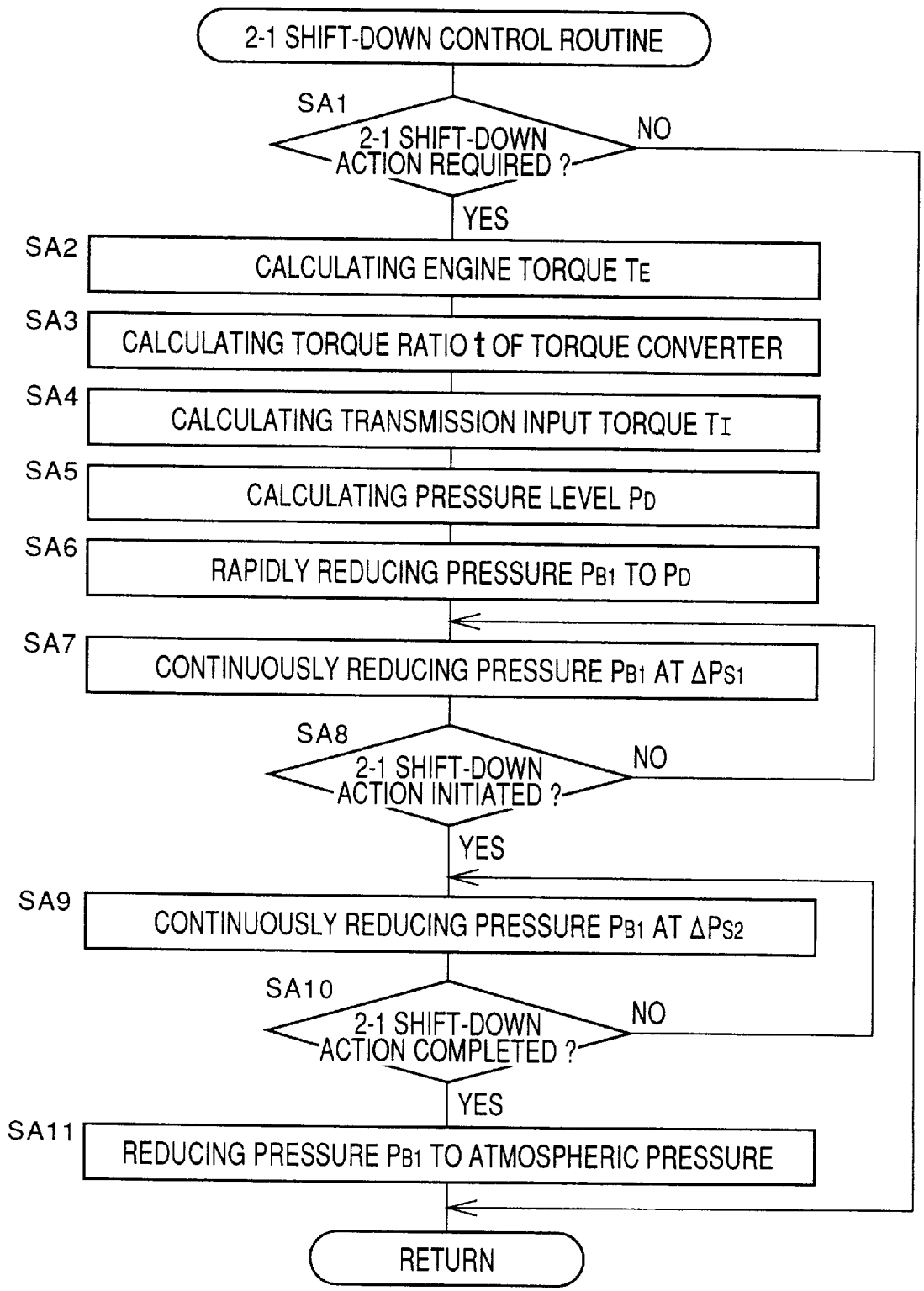
FIG. 10 is a flow chart illustrating an example of a 2–1 shift-down control routine executed by the transmission controller of FIG. 3.

The transmission controller 78 is adapted to execute a 2–1 shift-down control routine illustrated in the flow chart of FIG. 10.

The 2–1 shift-down control routine of FIG. 10 is initiated with step SA1 to determine whether the automatic transmission 14 should be shifted down from the second-speed position "2nd" to the first-speed position "1st", with the accelerator pedal 50 being depressed. This determination is effected by determining whether a point defined by the detected throttle opening angle θ and running speed V of the vehicle has moved across a stored predetermined 2–1 shift-down boundary line which is a relationship between the throttle opening angle θ and running speed V. Alternatively, the determination in step SA1 is effected by determining whether the shift lever 72 is operated from the DRIVE position "D" to the LOW position "L". If a negative decision (NO) is obtained in step SA1, one cycle of execution of the routine of FIG. 10 is terminated. If an affirmative decision (YES) is obtained in step SA1, the control flow goes to steps SA2, SA3 and SA4 corresponding to the input torque determining means 144.

Step SA2 is provided to calculate the output torque $T_E$ of the engine 10 on the basis of the detected engine speed $N_E$ and throttle opening angle θ and the predetermined relationship of FIG. 7. Step SA2 is followed by step SA3 to calculate the torque ratio or boosting ratio "r" of the torque converter 12 on the basis of the obtained speed ratio $e = N_T/N_E$ and according to the predetermined relationship of FIG. 8. Step SA3 is followed by step SA4 to calculate the input torque $T_I$ of the automatic transmission 14 by multiplying the engine output torque $T_E$ by the torque ratio "t" of the torque converter 12.

Then, the control flow goes to step SA5 corresponding to the first continuous pressure reduction means 134, to calculate the pressure level $P_D$ on the basis of the calculated input torque $T_I$ of the automatic transmission 14 and according to the predetermined relationship of FIG. 9. Step SA5 is followed by step SA6 corresponding to the rapid pressure reduction means 132, to reduce the pressure $P_{B1}$ of the brake B1 to the calculated pressure level $P_D$, as indicated at point "t1" in the graph of FIG. 6.

Step SA6 is followed by step SA7 corresponding to the first continuous pressure reduction means 134, wherein the pressure $P_{B1}$ which has been reduced to the level $P_D$ is continuously reduced at the first reduction rate $\Delta P_{S1}$. The control flow then goes to step SA8 corresponding to the shift-down action initiation monitoring means 136, to determine whether the 2–1 shift-down action of the automatic transmission 14 has been substantially initiated. This determination in step SA8 is effected by determining whether the input speed $N_T$ of the automatic transmission 14 has started to increase. If a negative decision (NO) is obtained in step SA8, the control flow goes back to step SA7. Step SA7 is repeatedly implemented to continuously reduce the pressure $P_{B1}$ at the first reduction rate $\Delta P_{S1}$ until an affirmative decision (YES) is obtained in step SA8.

When the affirmative decision (YES) is obtained in step SA8, the control flow goes to step SA9 corresponding to the second continuous pressure reduction means 138, in which the pressure $P_{B1}$ is continuously reduced at the second reduction rate $\Delta P_{S2}$, as indicated at point "t2" in the graph of FIG. 6. Then, step SA10 corresponding to the shift-down action completion monitoring means 150 is implemented to determine whether the 2–1 shift=down action is completed. This determination is effected by determining whether the input speed $N_T$ of the automatic transmission 14 has become equal to the product of the output speed $N_{OUT}$ of the automatic transmission 14 and the speed ratio $\rho_{1ST}$ of the first-speed position "1st" of the automatic transmission 14. If a negative decision (NO) is obtained in step SA10, the control flow goes back to step SA9. Step SA9 is repeatedly implemented to reduce the pressure $P_{B1}$ at the second reduction rate $\Delta P_{S2}$, until an affirmative decision (YES) is obtained in step SA10.

When the affirmative decision (YES) is obtained in step SA10, the control flow goes to step SA11 corresponding to the fully releasing means 142, in which the pressure $P_{B1}$ of the brake B1 is reduced to the atmospheric pressure.

As described above, the present apparatus for controlling the automatic transmission 14 is arranged such that upon determination of the 2–1 shift-down action of the automatic transmission 14 during acceleration of the motor vehicle with the accelerator pedal 50 placed in a depressed state, the pressure $P_{B1}$ of the brake B1 is first rapidly reduced to the level $P_D$ which is determined depending upon the input torque TI of the automatic transmission 14, to be slightly higher than the level at which the brake B1 starts slipping. As the pressure $P_{B1}$ is then continuously reduced to release the brake B1, the 2–1 shift-down action of the automatic transmission 14 is substantially initiated with initiation of a slipping action of the brake B1. Generally, the pressure $P_{B1}$ at which the brake B1 starts slipping during the ACCELERATOR-ON 2–1 shift-down action varies with the input torque $T_I$ of the automatic transmission 14. In the present embodiment wherein the pressure level $P_D$ to which the pressure $P_{B1}$ is initially reduced at a relatively high rate is determined by the rapid pressure reduction amount determining means 146 (SA5), depending upon the input torque $T_I$, so that the determined pressure level $P_D$ is higher by a suitable small amount than the critical level at which the brake B1 starts slipping with the specific input torque $T_I$. In the process of the subsequent continuous reduction of the pressure $P_{B1}$, the brake starts to slip, causing substantial initiation of the 2–1 shift-down action of the automatic transmission 14. Since the pressure level $P_D$ to which the pressure $P_{B1}$ is rapidly reduced is determined with the actual input torque $T_I$ being taken into account, the pressure level $P_D$ would not be excessively higher or lower than the above-indicated critical level, when the automatic transmission 14 is shifted down to the first-speed position as a result of the operation of the shift lever 72 from the DRIVE position to the LOW position "L", or as a result of a change in the road surface gradient and/or the throttle opening angle θ. The 2–1 shift-down action requires an unnecessarily long time if the pressure level $P_D$ is excessively high, and suffers from a considerable shifting shock if the pressure level $P_D$ is excessively low. Therefore, the present control apparatus permits the 2–1 shift-down action of the automatic transmission 14 to be achieved in a comparatively short time and with a reduced shifting shock.

Further, the present control apparatus uses the rapid pressure reduction means 132 (step SA6) for rapidly reducing the pressure $P_{B1}$ of the brake B1 to the pressure level $P_D$ suitably determined as described above, the first continuous pressure reduction means 134 (SA7) for continuously reducing the pressure $P_{B1}$ from the pressure level $P_D$ at the predetermined first rate $\Delta P_{S1}$, and the second continuous pressure reduction means 138 (SA9) for continuously reducing the pressure $P_{B1}$ at the second rate $\Delta P_{S2}$ lower than the first rate $\Delta P_{S1}$, after the determination by the shift-down action initiation monitoring means 136 (SA8) that the 2–1 shift-down action has been substantially initiated. Thus, the rate at which the pressure $P_{B1}$ is continuously reduced is lowered from $\Delta P_{S1}$ to $\Delta P_{S2}$ upon the substantial initiation of the 2–1 shift-down action of the automatic transmission 14, so as to minimize the shifting shock of the automatic transmission. The present control apparatus including the rapid pressure reduction means 132 and the first and second continuous pressure reduction means 134, 138 is not only capable of shortening a delay time $T_{SA}$ (FIG. 6) from the moment of decision to effect the 2–1 shift-down action to the moment of the substantial initiation of the 2–1 shift-down action, owing to the rapid reduction of the pressure $P_D$ to the pressure level $P_D$ at the point of time "t1" (FIG. 6), but also capable of reducing the shifting shock of the automatic transmission owing to a decrease in the rate of continuous reduction of the pressure $P_{B1}$ from the value $\Delta P_{S1}$ to the value $\Delta P_{S2}$ upon detection or determination of the substantial initiation of the 2–1 shift-down action at the point of time "t2" (FIG. 6). In the power transmission system wherein the automatic transmission 14 is controlled by the present control apparatus, the delay time $T_{SA}$ is shorter, and the shifting shock is smaller, than in a power transmission system wherein the automatic transmission is controlled by a control apparatus adapted to reduce the pressure $P_{B1}$ at a constant rate during the 2–1 shift-down action.

Referring to FIGS. 11–24, there will be described other embodiments of this invention. The same reference numerals and characters used in the first embodiment will be used to identify the functionally corresponding components or elements, and redundant description of these elements will not be provided in the interest of simplification.

Figure 11:
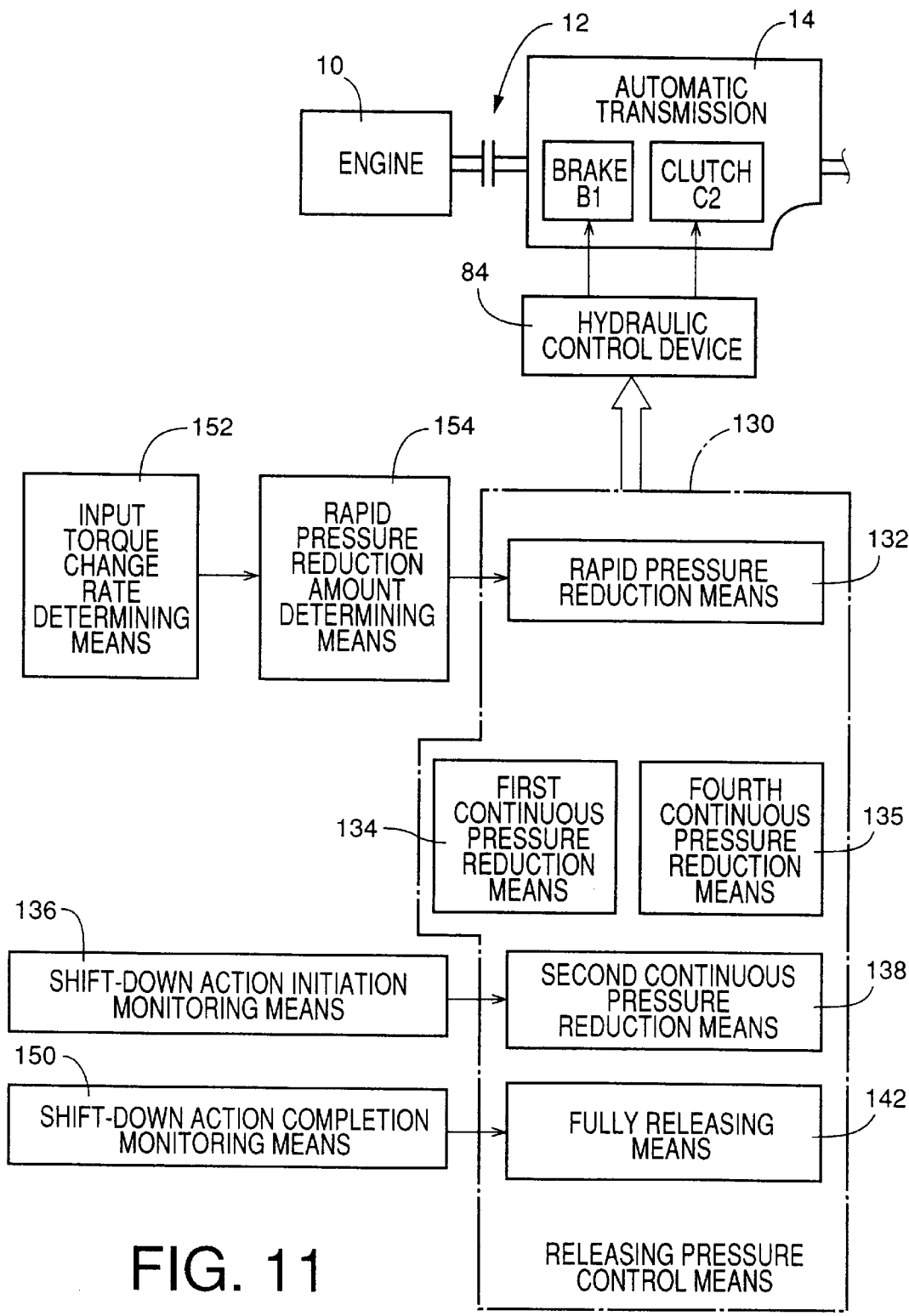
FIG. 11 is a block diagram corresponding to that of FIG. 5, illustrating various functional means of a transmission controller according to a second embodiment of this invention.
Figure 12:
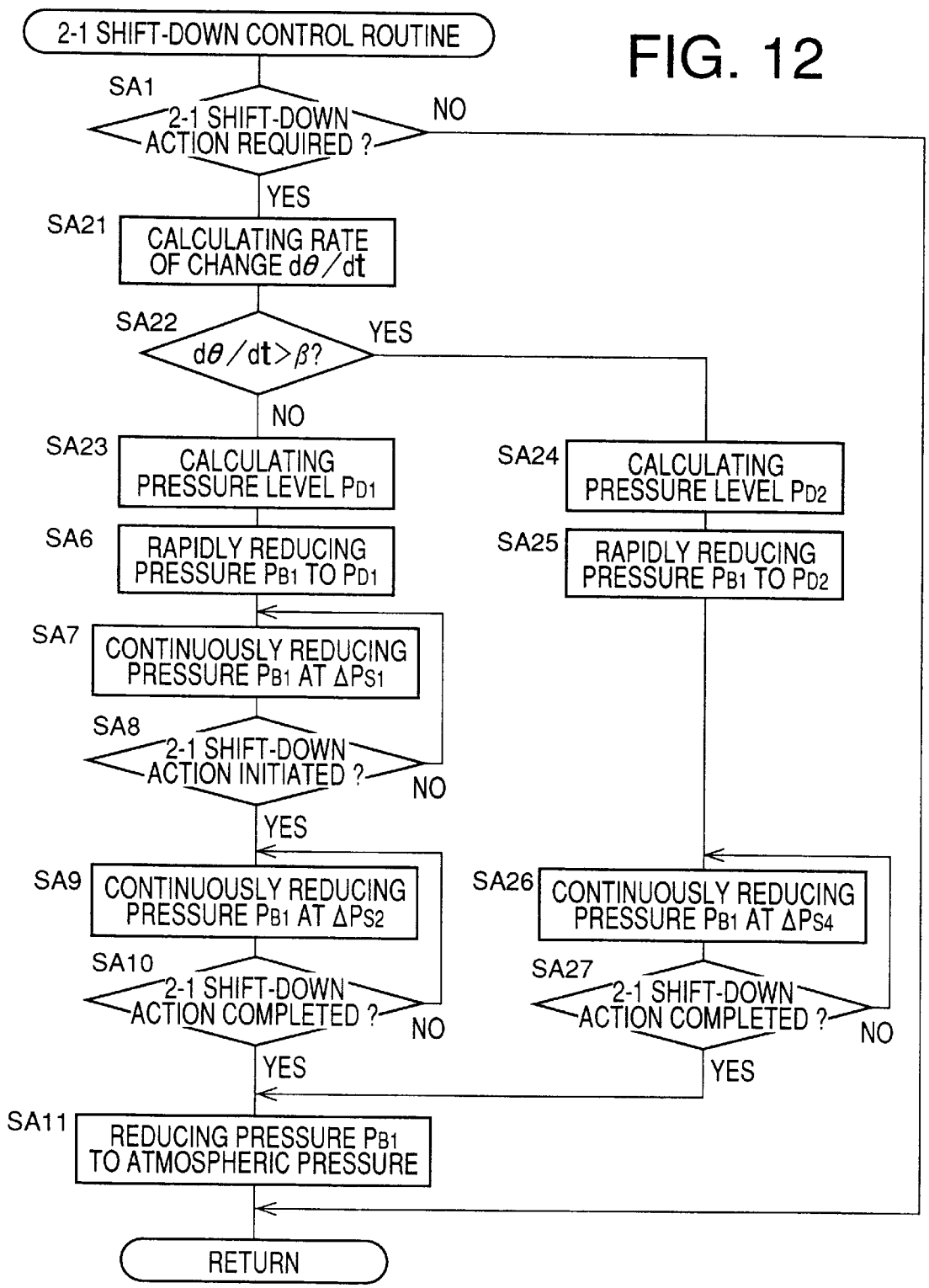
FIG. 12 is a flow chart corresponding to that of FIG. 11, illustrating an example of a 2–1 shift-down control routine executed by the transmission controller of FIG. 11.

The transmission controller 78 constructed according to a second embodiment of the present invention has functional means as illustrated in the block diagram of FIG. 11, and is adapted to execute a 2–1 shift-down control routine illustrated in the flow chart of FIG. 12. The present second embodiment is identical with the first embodiment of FIGS. 5–10, except that input torque change rate determining means 152 and rapid pressure reduction amount determining means 154 are substituted for the input torque determining means 144 and the rapid pressure reduction amount determining means 146 of FIG. 5, and that the releasing pressure control means 130 further incorporates fourth continuous pressure reduction means 135.

The input torque change rate determining means 152 is adapted to calculate a rate of change of the input torque $T_I$ of the automatic transmission 14. Namely, the input torque $T_I$ is calculated from time to time at a predetermined time interval, on the basis of the detected engine speed $N_E$ and throttle opening angle θ and according to the predetermined relationship of FIG. 7, and the rate of change of the input torque $T_I$ is calculated on the basis of the amounts of changes of the calculated input torque values $T_I$ during the predetermined time interval. Alternatively, a rate of change dθ/dt of the throttle opening angle θ may be used as the rate of change of the input torque $T_I$, since the input torque $T_I$ has a given relationship with the throttle opening angle θ.

The rapid pressure reduction amount determining means 154 is adapted to determine the pressure level $P_D$ (to which the pressure $P_{B1}$ is rapidly reduced), on the basis of the rate of change of the input torque $T_I$ determined by the input torque change rate determining means 152, and according to a predetermined relationship between the input torque change rate and the pressure level $P_D$, which relationship is formulated such that the pressure level $P_D$ decreases with an increase in the rate of change of the input torque $T_I$. For instance, the determining means 154 is arranged to determine the pressure level $P_D$ to be $P_{D1}$ when the rate of change of the input torque $T_I$ is held in a normal range, and to be $P_{D2}$ when the rate of change of the input torque $T_I$ exceeds the upper limit of the normal range, as a result of an abrupt depression of the accelerator pedal 50 by the vehicle operator who wishes to shift-down the transmission 14. The value $P_{D1}$ is in a range similar to that of the pressure level $P_D$ in the first embodiment of FIGS. 5–10, while the value $P_{D2}$ is smaller than the value $P_{D1}$.

The fourth continuous pressure reduction means 135 is adapted to continuously reduce the pressure $P_{B1}$ from the pressure level $P_D$ ($P_{D1}$ or $P_{D2}$) at a fourth reduction rate $\Delta P_{S4}$ which is lower than the first reduction rate $\Delta P_{S1}$ and higher than the second reduction rate $\Delta P_{S2}$, if the rate of change of the input torque $T_I$ is comparatively high with the rate of change dθ/dt of the throttle opening angle θ being higher than a predetermined threshold β.

In the 2–1 shift-down control routine of FIG. 12, step SA21 corresponding to the input torque change rate determining means 152 is implemented if the affirmative decision (YES) is obtained in step SA1. Step SA21 is provided to calculate the rate of change dθ/dt of the throttle opening angle θ, as the rate of change of the input torque $T_I$. Step SA21 is followed by steps SA22, SA23 and SA24 corresponding to the rapid pressure reduction amount determining means 154. Step SA22 is provided to determine whether the rate of increase $d\theta/dt$ of the throttle opening angle $\theta$ is higher than the threshold $\beta$. This threshold $\beta$ is determined to be an upper limit above which the input torque $T_I$ is considered to be increasing at a considerably high rate, with the accelerator pedal 50 being abruptly depressed by the vehicle operator in an attempt to shift-down the automatic transmission 14.

Figure 13:
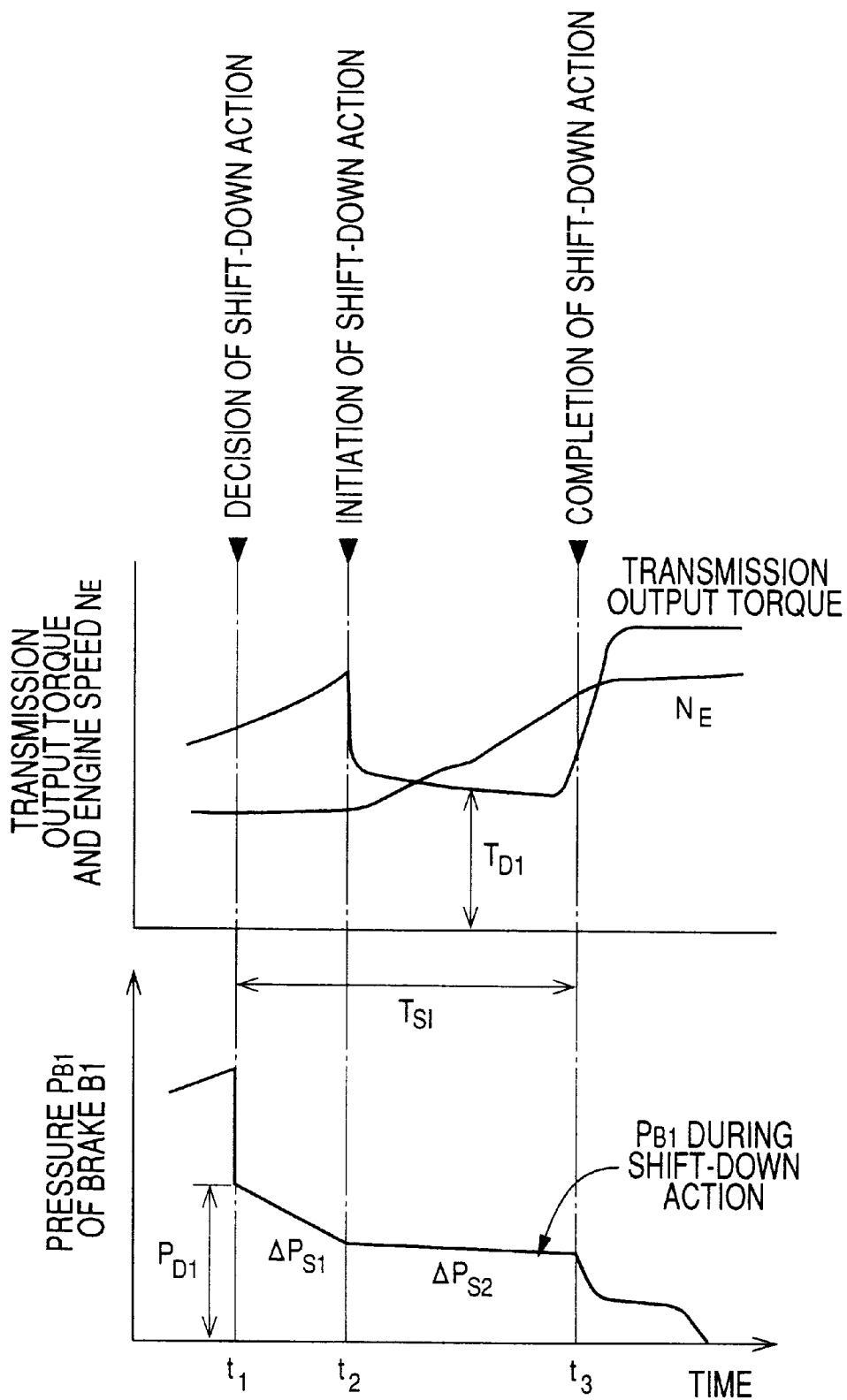
FIG. 13 is a time chart indicating changes of the engine speed $N_E$ (=$N_T$), transmission output torque $T_{OUT}$ and engaging pressure $P_{B1}$ of the brake B1, when the rate of change of transmission input torque during the shift-down action is comparatively low.

If a negative decision (NO) is obtained in step SA22, it means that the input torque $T_I$ is increasing at a comparatively low rate, namely, the rate of increase of the input torque $T_I$ is within a normal range. In this case, the control flow goes to step SA23 to calculate the engine torque $T_E$ and the torque ratio "t" of the torque converter 12, and calculate. the input torque $T_I$ on the basis of the engine torque $T_E$ and the torque ratio "t", as in steps SA2–SA4. In step SA23, the pressure level $P_{D1}$ is determined on the basis of the calculated input torque $T_I$ and according to the predetermined relationship as illustrated in the graph of FIG. 9 by way of example. Then, steps SA6–SA11 are implemented in the same manner as in the first embodiment of FIG. 10. In this case, the output torque of the automatic transmission 14 and the engine speed $N_E$ change during the 2–1 shift-down action, as shown in FIG. 13, as in the first embodiment of FIG. 6.

If an affirmative decision (YES) is obtained in step SA22, it means that the input torque $T_I$ is increasing at a comparatively high rate, with the accelerator pedal 50 being abruptly depressed by the vehicle operator who wishes to shift down the automatic transmission 14. In this case, the control flow goes to step SA24 to calculate the pressure level $P_{D2}$, on the basis of the input torque $T_I$ calculated in the same manner as in steps SA2–SA4, and according to a stored predetermined relationship between $T_I$ and $P_{D2}$, which relationship is formulated such that the pressure level $P_{D2}$ is lower than the pressure level $P_{D1}$ calculated in step SA23. As in the first embodiment, the relationships used in steps SA23 and SA24 are formulated so that the pressure levels $P_{D1}$, $P_{D2}$ are higher by a predetermined small amount higher than the critical value at which the brake B1 starts slipping.

Figure 14:
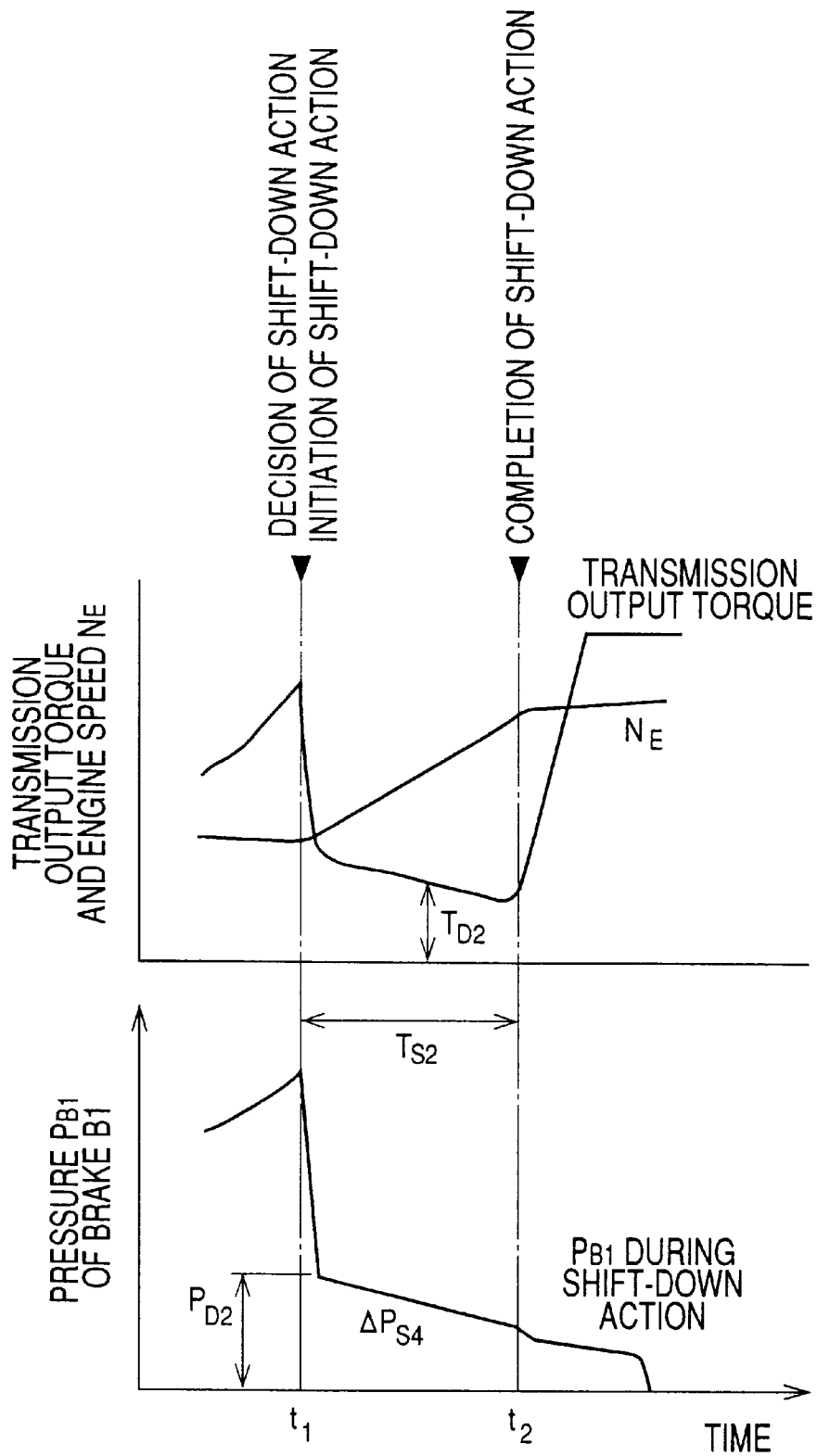
FIG. 14 is a time chart corresponding to that of FIG. 13, when the rate of change of the transmission input torque is comparatively high.

Step SA24 is followed by step SA25 corresponding to the rapid pressure reduction means 132, in which the pressure $P_{B1}$ is rapidly reduced to the pressure level $P_{D2}$, as indicated at point "t1" in the graph of FIG. 14. then, the control flow goes to step SA26 corresponding to the fourth continuous pressure reduction means 135, to reduce the pressure $P_{B1}$ from the pressure level $P_{D2}$ at the fourth reduction rate $\Delta P_{S4}$ which is lower than the first reduction rate $\Delta P_{S1}$ but is higher than the second reduction rate $\Delta P_{S2}$. Step SA26 is followed by step SA27 corresponding to the shift-down action completion monitoring means 150, to determine whether the 2–1 shift-down action is completed. If a negative decision (NO) is obtained in step SA27, the control flow goes to step SA26. Step SA26 is repeatedly implemented to continuously reduce the pressure $P_{B1}$ until an affirmative decision (YES) is obtained in step SA27. When the affirmative decision (YES) is obtained in step SA27, as indicated at "t2" in FIG. 14, the control flow goes to step SA11 in which the pressure $P_{B1}$ of the brake B1 is reduced to the atmospheric pressure. Thus, one cycle of execution of the routine of FIG. 12 is terminated.

In the present second embodiment of FIGS. 11–14, the pressure $P_{B1}$ of the brake B1 which is released to achieve the 2–1 shift-down action of the automatic transmission 14 during acceleration of the motor vehicle with the accelerator pedal 50 placed in a depressed state is first rapidly reduced to the level $P_D$ which is determined depending upon the rate of increase of the input torque $T_I$ of the automatic transmission 14 (rate of increase $d\theta/dt$ of the throttle opening angle $\theta$). As the pressure PB1 is then continuously reduced to release the brake B1, the 2–1 shift-down action of the automatic transmission 14 is substantially initiated with initiation of a slipping action of the brake B1. Generally, the rate of increase of the input torque $T_I$ or throttle opening angle $\theta$ is high when the accelerator pedal is depressed by the vehicle operator abruptly or to fully open the throttle valve 52, for shifting down the automatic transmission 14 to accelerate the vehicle at a relatively high rate. In this case, the vehicle operator usually requires the automatic transmission 14 to exhibit a high response to the operator's manipulation of the accelerator pedal, rather than smoothness of the shift-down action with a reduced shifting shock. The present embodiment is suitable for meeting this requirement, since the pressure level $P_D$ to which the pressure $P_{B1}$ is initially rapidly reduced is determined depending upon the rate of increase of the input torque $T_I$, more specifically, the pressure level $P_D$ decreases with an increase of the rate of increase of the input torque $T_I$, so that the shift-down action is initiated in a relatively short time after the moment of decision to achieve the shift-down action. Thus, the present control apparatus assures a sufficiently high response of the automatic transmission 14 to the operator's depression of the accelerator pedal 50.

When the automatic transmission 14 is shifted down in an ordinary running condition without an abrupt depression of the accelerator pedal 50, the vehicle operator does not expect a shift-down action of the automatic transmission 14. In this case, therefore, it is desirable that the shift-down action be effected with a minimum shifting shock. The present embodiment is adapted to meet this desire. Namely, the pressure level $P_{D1}$ determined in step SA23 when the rate of increase of the input torque $T_I$ is relatively low is higher than the pressure level $P_{D2}$ determined in step SA24 when the rate of increase of the input torque $T_I$ is relatively high, whereby an output torque value $T_{D1}$ of the automatic transmission 14 upon initiation of the 2–1 shift-down action when the rate of increase of the input torque $T_I$ is relatively low is larger than an output torque value $T_{D2}$ of the automatic transmission 14 upon initiation of the shift-down action when the rate of increase of the input torque $T_I$ is relatively high, as indicated in FIGS. 13 and 14. Thus, the amount of change of the output torque $T_D$ of the automatic transmission 14 is reduced to reduce the shifting shock when the rate of increase of the input torque $T_I$ is relatively low. Conversely, the pressure level $P_{D2}$ determined in step SA24 when the rate of increase of the input torque $T_I$ is relatively high is lower than the pressure level $P_{D1}$ determined in step SA23 when the rate of increase of the input torque $T_I$ is relatively low, whereby the output torque value $T_{D2}$ of the automatic transmission 14 upon initiation of the 2–1 shift-down action when the rate of increase of the input torque $T_I$ is relatively high is smaller than the output torque value $T_{D1}$ when the rate of increase of the input torque $T_I$ is relatively low, as also indicated in FIGS. 13 and 14. Thus, a time $T_{S2}$ required for completing the shift-down action when the rate of increase of the input torque $T_I$ is relatively high is shorter than a time $T_{S1}$ required for completing the shift-down action when the rate of increase of the input torque $T_I$ is relatively low, as indicated in FIGS. 13 and 14. This means a comparatively high response of the automatic transmission 14 to the operator's depression of the accelerator pedal 50 to shift-down the automatic transmission 14.

The control apparatus according this second embodiment also uses the rapid pressure reduction means 132 (step SA6)

for rapidly reducing the pressure $P_{B1}$ of the brake B1 to the pressure level $P_D$ suitably determined as described above, the first continuous pressure reduction means 134 (SA7) for continuously reducing the pressure $P_{B1}$ from the pressure level $P_D$ at the predetermined first rate $\Delta P_{S1}$, and the second continuous pressure reduction means 138 (SA9) for continuously reducing the pressure $P_{B1}$ at the second rate $\Delta P_{S2}$ lower than the first rate $\Delta P_{S1}$, after the determination by the shift-down action initiation monitoring means 136 (SA8) that the 2–1 shift-down action has been substantially initiated. Thus, the rate at which the pressure $P_{B1}$ is continuously reduced is lowered from $\Delta P_{S1}$ to $\Delta P_{S2}$ upon the substantial initiation of the 2–1 shift-down action of the automatic transmission 14, so as to minimize the shifting shock of the automatic transmission. The present control apparatus including the rapid pressure reduction means 132 and the first and second continuous pressure reduction means 134, 138 is not only capable of shortening a delay time from the moment of decision to effect the 2–1 shift-down action to the moment of the substantial initiation of the 2–1 shift-down action, owing to the rapid reduction of the pressure $P_{B1}$ to the pressure level $P_D$ at the point of time "t1", but also capable of reducing the shifting shock of the automatic transmission owing to a decrease in the rate of continuous reduction of the pressure $P_{B1}$ from the value $\Delta P_{S1}$ to the value $\Delta P_{S2}$ upon detection or determination of the substantial initiation of the 2–1 shift-down action at the point of time "t2" (FIG. 13). In the present power transmission system wherein the automatic transmission 14 is controlled by the present control apparatus, the delay time is shorter, and the shifting shock is smaller, than in the power transmission system wherein the automatic transmission is controlled by a control apparatus adapted to reduce the pressure $P_{B1}$ at a constant rate during the 2–1 shift-down action.

Figure 15:
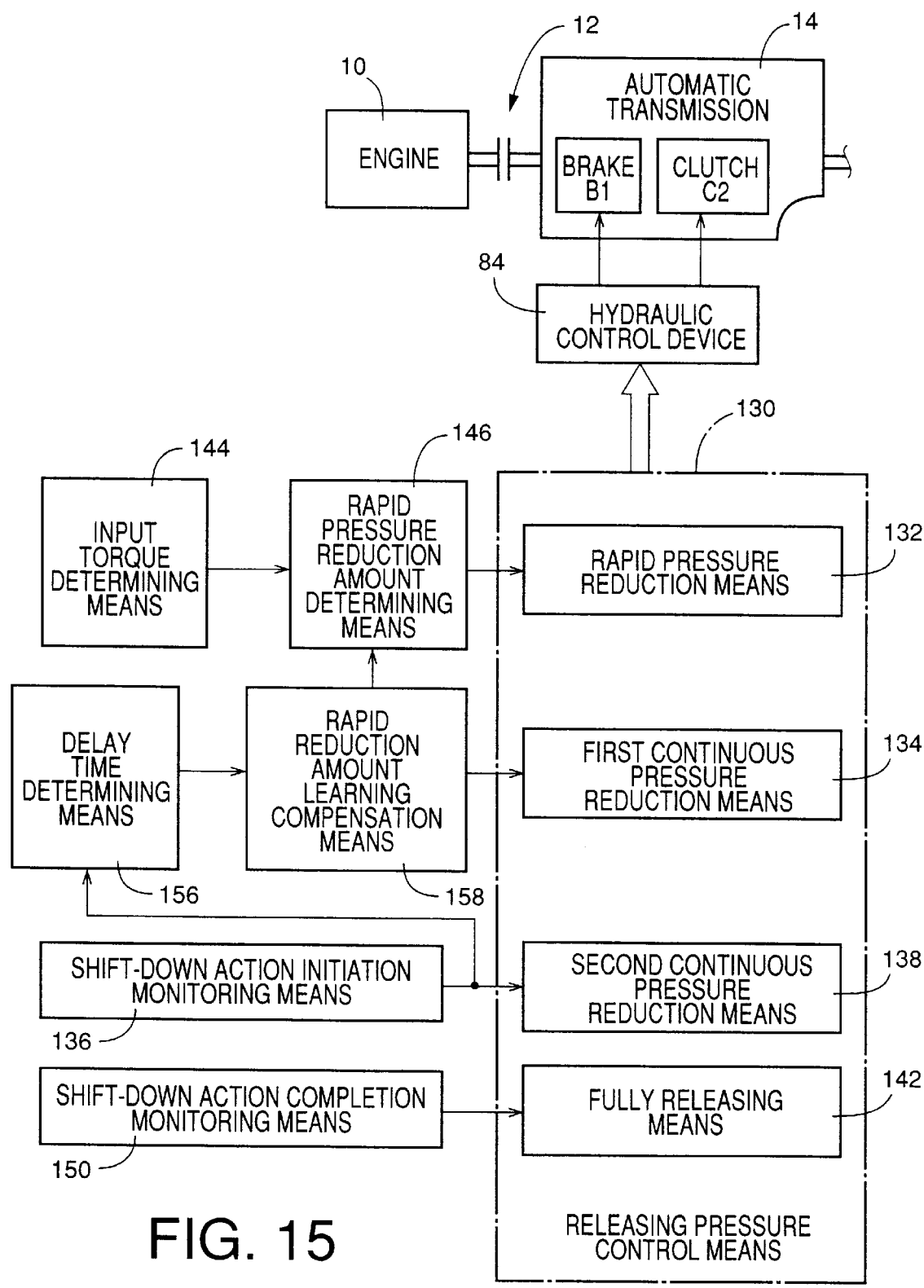
FIG. 15 is a block diagram corresponding to that of FIG. 5, illustrating various functional means of a transmission controller according to a third embodiment of this invention.
Figure 16:
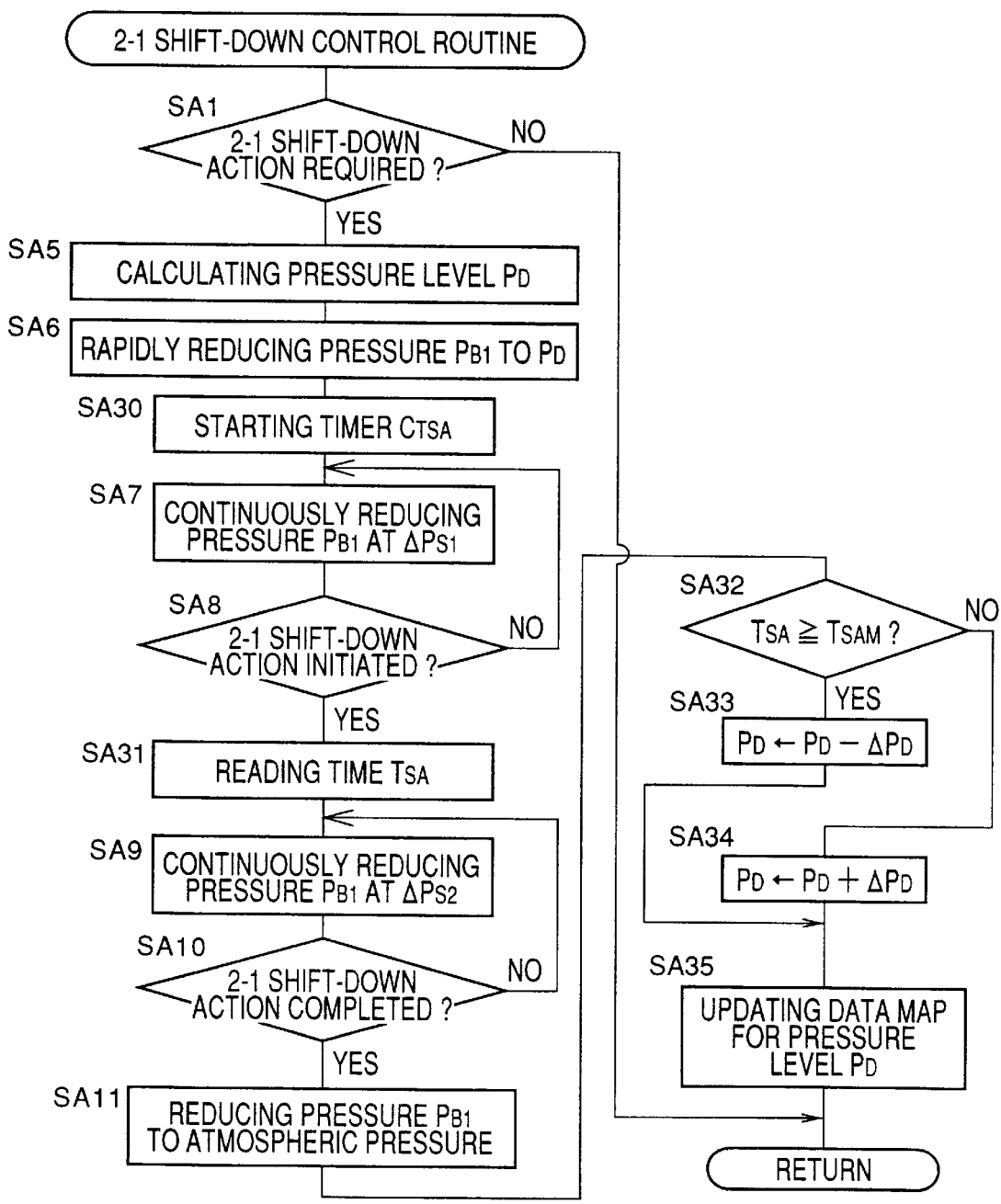
FIG. 16 is a flow chart corresponding to that of FIG. 10, illustrating a 2–1 shift-down control routine executed by the transmission controller of FIG. 15.

The transmission controller 78 constructed according to a third embodiment of the present invention has functional means as illustrated in the block diagram of FIG. 15, and is adapted to execute a 2–1 shift-down control routine illustrated in the flow chart of FIG. 16. The present third embodiment is identical with the first embodiment of FIGS. 5–10, except that delay time determining means 156 and rapid reduction amount learning compensation means 158 are added in the present third embodiment. The following description relates primarily to these means 156, 158 characteristic of the present embodiment.

The delay time determining means 156 is adapted to determine a delay time $T_{SA}$ between the moment of decision to achieve the 2–1 shift-down action of the automatic transmission 14 and the moment of determination of the substantial initiation of the 2–1 shift-down action by the shift-down action initiation determining means 136. The delay time: determining means 156 uses a timer $C_{TSA}$ which is started or turned on at the moment of the decision to achieve the 2–1 shift-down action and is stopped or turned off at the moment of determination of the substantial initiation of the shift-down action.

The rapid reduction amount learning compensation means 158 is adapted to effect learning compensation of the pressure level $P_D$ originally determined by the rapid pressure reduction amount determining means 146, such that the delay time $T_{SA}$ determined by the delay time determining means 156 coincides with a predetermined target value $T_{SAM}$. For instance, the learning compensation means 158 is arranged to reduce the originally determined pressure level $P_D$ by a predetermined decrement $\Delta P_D$, for obtaining a compensated pressure level $(P_D - \Delta P_D)$, if the delay time $T_{SA}$ determined in the present control cycle is not shorter than the target value $T_{SAM}$. The compensated pressure level $(P_D - \Delta P_D)$ is used as the pressure level $P_D$ in the next control cycle.

In the 2–1 shift-down control routine of FIG. 16, step SA30 follows steps SAS and SA6 implemented if the affirmative decision (YES) is obtained in step SA1. Step SA30 is provided to start or turn on the timer $C_{TSA}$ for measuring a time lapse after the affirmative decision (YES) is obtained in step SA1, namely, after the determination that the 2–1 shift-down action of the automatic transmission 14 should be effected. Further, step SA31 is implemented to read the content of the timer $C_{TSA}$, namely, the delay time $T_{SA}$, if the affirmative decision (YES) is obtained in step SA8, that is, if the 2–1 shift-down action has been substantially initiated. It will be understood that steps SA30 and SA31 correspond to the delay time determining means 156.

Step SA11 to reduce the pressure $P_{B1}$ of the brake B1 to the atmospheric pressure is followed by step SA32 to determine whether the delay time $T_{SA}$ read in step SA31 is equal to or longer than the target value $T_{SAM}$. If an affirmative decision (YES) is obtained in step SA32, the control flow goes to step SA33 to subtract the predetermined decrement $\Delta P_D$ from the pressure level $P_D$ which was determined in step SA5 on the basis of the input torque $T_I$ and according to the stored relationship illustrated in the graph of FIG. 9 by way of example. The thus compensated value $(P_D + \Delta P_D)$ will be used as the pressure level $P_D$ to reduce the delay time $T_{SA}$, in the next control cycle where the input torque $T_I$ is the same as in the present control cycle. It will be understood from the graph of FIG. 17 that the delay time $T_{SA}$ for a given input torque value $T_I$ increases with an increase in the pressure level $P_D$. With the step SA34 repeatedly implemented for learning compensation of the pressure level $P_D$, the compensated pressure level $P_D$ may be increased from a value indicated at point B in FIG. 16 up to the level indicated at point C at which the delay time TSA being equal to the target value $T_{SAM}$.

If a negative decision (NO) is obtained in step SA32, the control flow goes to step SA34 to add a predetermined increment $\Delta P_D$ to the pressure level $P_D$ which was determined in step SA5 on the basis of the input torque $T_I$ and according to the stored relationship of FIG. 9. The thus compensated value $(P_D + \Delta P_D)$ will be used as the pressure level $P_D$ to increase the delay time $T_{SA}$, in the next control cycle where the input torque $T_I$ is the same as in the present control cycle. It will be understood from the graph of FIG. 17 that the delay time $T_{SA}$ for a given input torque value $T_I$ increases with an increase in the pressure level $P_D$. With the step SA33 repeatedly implemented for learning compensation of the pressure level $P_D$, the compensated pressure level $P_D$ may be reduced from a value indicated at point A in FIG. 16 down to a level indicated at point C at which the delay time TSA being equal to the target value $T_{SAM}$.

Steps SA33 and SA34 are followed by step SA35 in which a stored data map representative of the relationship of FIG. 9 is updated so as to reflect the learning compensation of the pressure level $P_D$ in steps SA33 and SA34, that is, to replace the normal or original pressure level $P_D$ by the compensated value $(P_D - \Delta P_D)$ or $(P_D + \Delta P_D)$. It will be understood that steps SA32 through SA35 correspond to the rapid reduction amount learning compensation means 158.

Figure 17:
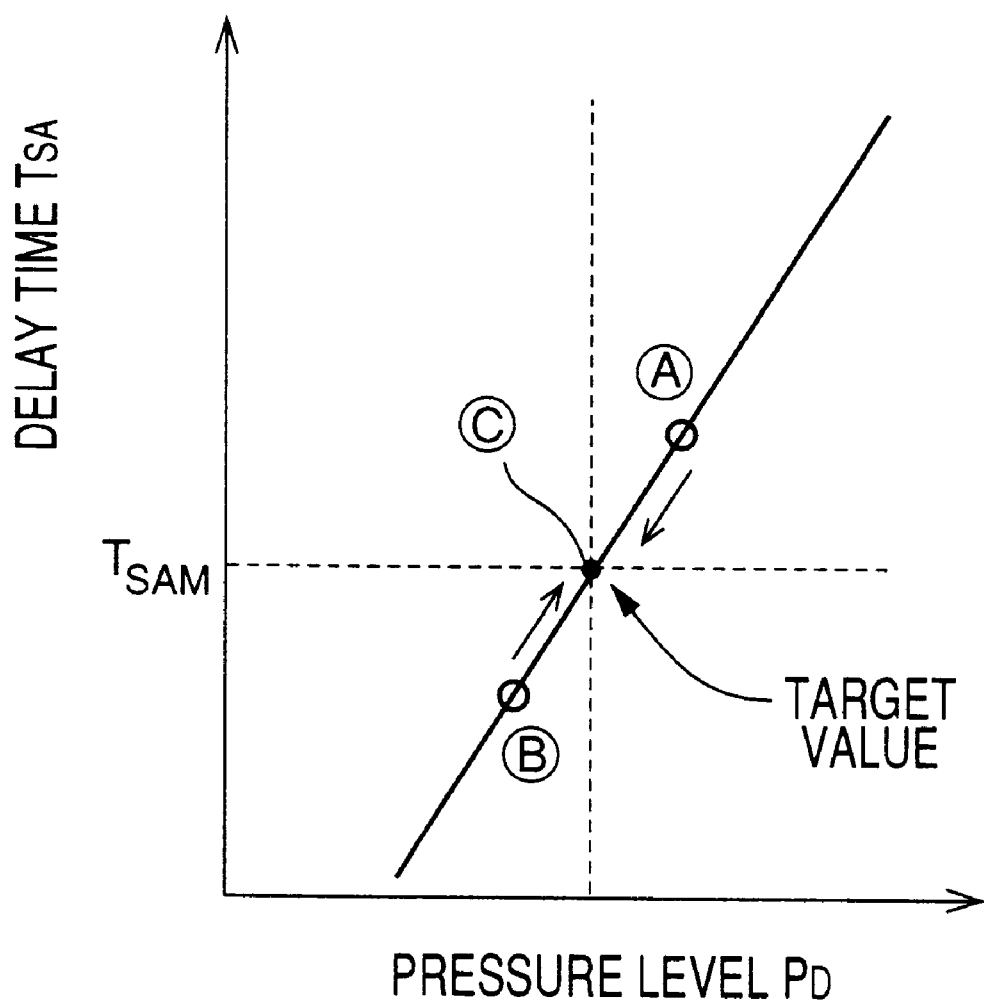
FIG. 17 is a view for explaining learning compensation of rapid pressure reduction amount $P_D$, in the embodiment of FIGS. 15 and 16, so that a delay time $T_{SA}$ between decision and initiation of a 2–1 shift-down action of the transmission coincides with a target value $T_{SAM}$.

In the control apparatus according to this third embodiment of FIGS. 15–17 of the invention, the pressure $P_{B1}$ of the brake B1 is controlled as indicated in FIG. 6 during the 2–1 shift-down action of the automatic transmission 14. Further, the pressure level $P_D$ determined by the rapid pressure reduction amount determining means 146 (SA6) is changed by learning compensation by the rapid reduction amount learning compensation means 158 (SA32–SA35) so that the actual delay time $T_{SA}$ determined by the delay time determining means 156 (SA30 and SA31) coincides with the predetermined target value $T_{SAM}$, which may be a fixed constant value or may change with a selected parameter. In the present arrangement, therefore, the delay time $T_{SA}$ from the moment of determination to achieve the 2–1 shift-down action to the moment of substantial initiation of the shift-down action can coincide with the target value $T_{SAM}$, with high accuracy, irrespective of a change in the temperature of the working oil used for the automatic transmission 14, or a chronological change in the operating characteristic of the brake B1. The present arrangement is effective to minimize the shifting shock of the automatic transmission 14 and prevent its deterioration of the shifting response, permitting the shift-down action to be achieved in an adequate manner.

The control apparatus according to this third embodiment also uses the rapid pressure reduction means 132 (step SA6) for rapidly reducing the pressure $P_{B1}$ of the brake B1 to the pressure level $P_D$ suitably determined as described above, the first continuous pressure reduction means 134 (SA7) for continuously reducing the pressure $P_{B1}$ from the pressure level $P_D$ at the predetermined first rate $\Delta P_{S1}$, and the second continuous pressure reduction means 138 (SA9) for continuously reducing the pressure $P_{B1}$ at the second rate $\Delta P_{S2}$ lower than the first rate $\Delta P_{S1}$, after the determination by the shift-down action initiation monitoring means 136 (SA8) that the 2–1 shift-down action has been substantially initiated. The present control apparatus including the rapid pressure reduction means 132 and the first and second continuous pressure reduction means 134, 138 is not only capable of shortening a delay time from the moment of decision to effect the 2–1 shift-down action to the moment of the substantial initiation of the 2–1 shift-down action, owing to the rapid reduction of the pressure $P_{B1}$ to the pressure level $P_D$, but also capable of reducing the shifting shock of the automatic transmission owing to a decrease in the rate of continuous reduction of the pressure $P_{B1}$ from the value $\Delta P_{S1}$ to the value $\Delta P_{S2}$ upon detection or determination of the substantial initiation of the 2–1 shift-down action. In the present power transmission system wherein the automatic transmission 14 is controlled by the present control apparatus, the delay time is shorter, and the shifting shock is smaller, than in the power transmission system wherein the automatic transmission is controlled by a control apparatus adapted to reduce the pressure $P_{B1}$ at a constant rate during the 2–1 shift-down action.

Figure 18:
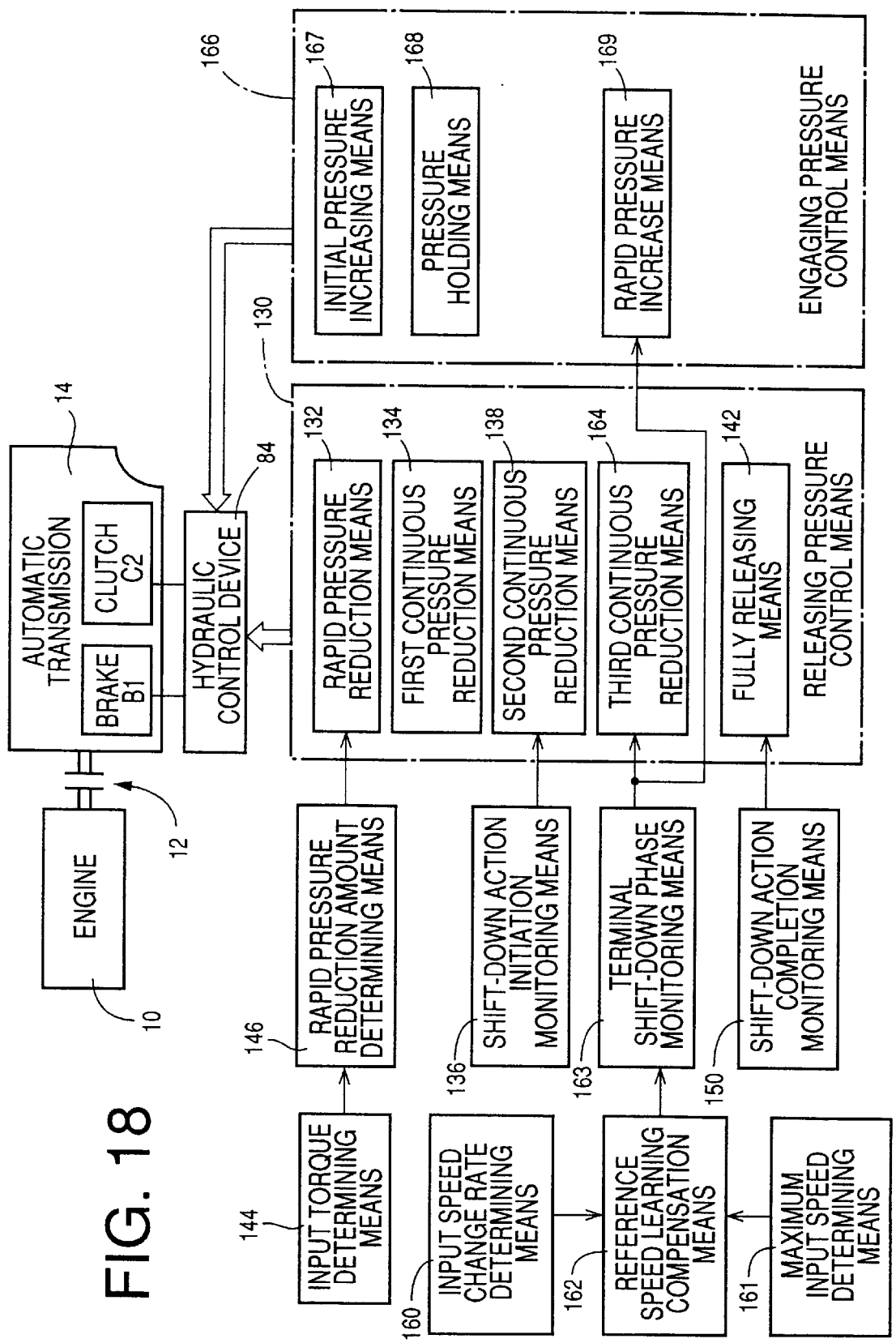
FIG. 18 is a block diagram corresponding to that of FIG. 5, illustrating various functional means of a transmission controller according to a fourth embodiment of this invention.
Figure 19:
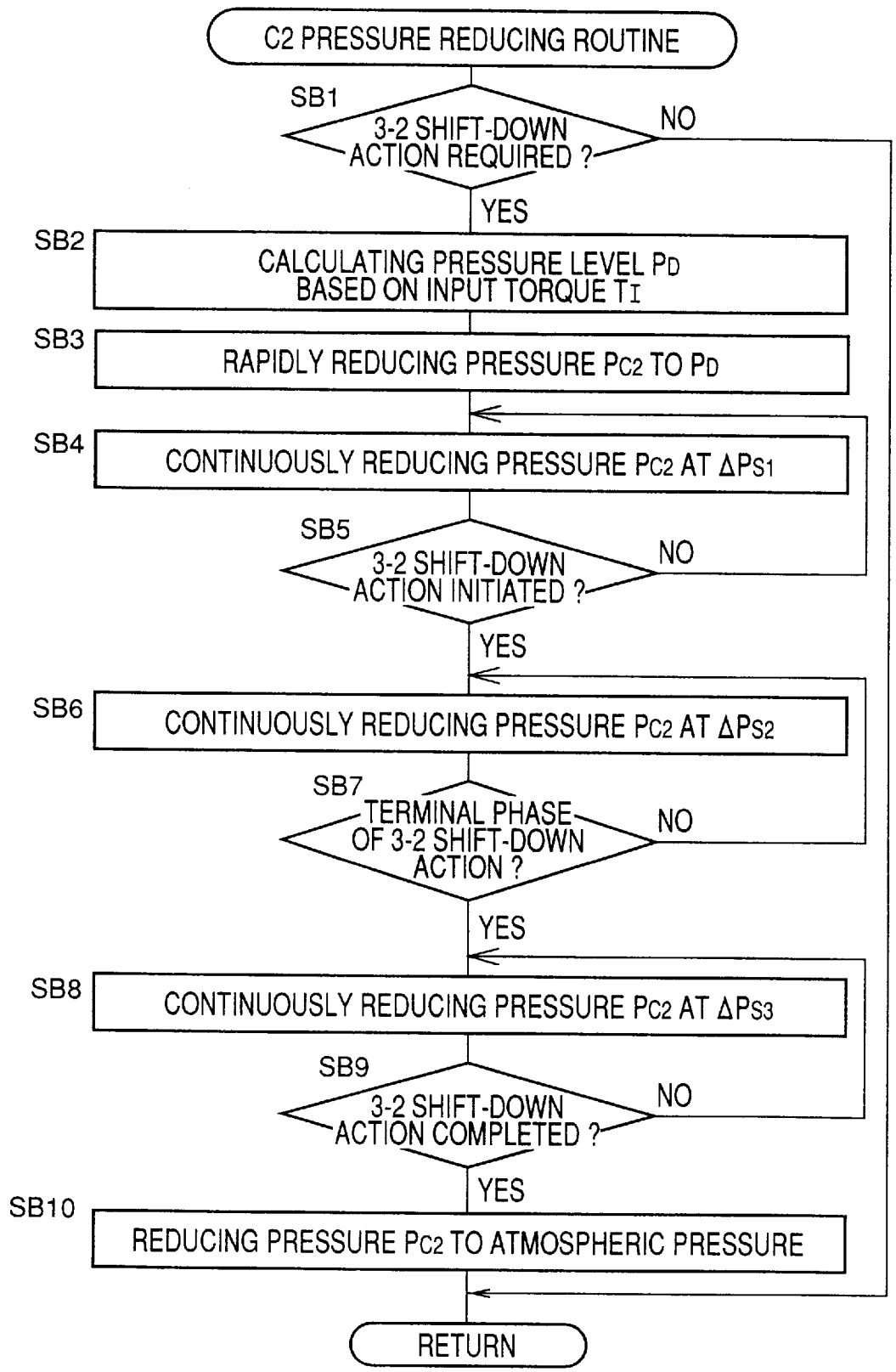
FIG. 19 is a flow chart illustrating a C2 pressure reducing routine executed by the transmission controller of FIG. 18 for reducing a pressure $P_{C2}$ of clutch C2.
Figure 20:
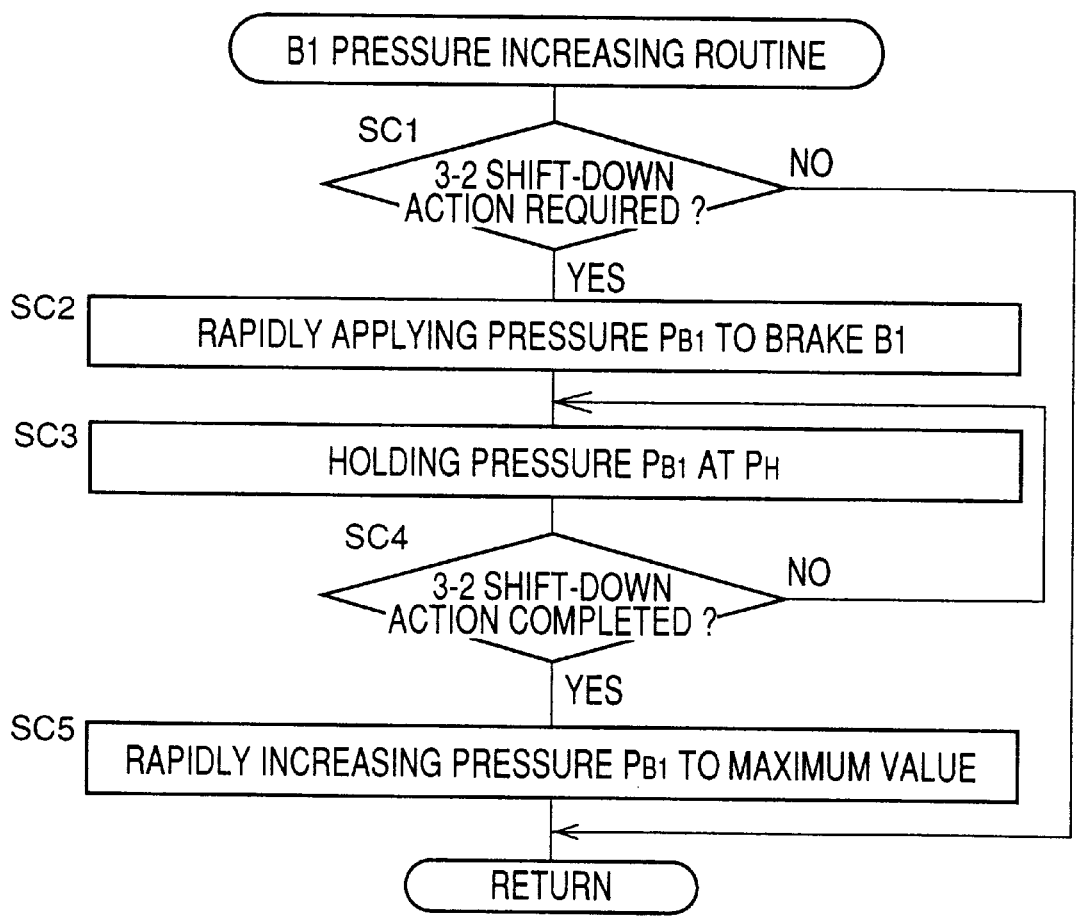
FIG. 20 is a flow chart illustrating a B1 pressure increasing routine executed by the transmission controller of FIG. 18 for increasing a pressure $P_{B1}$ of brake B1.
Figure 21:
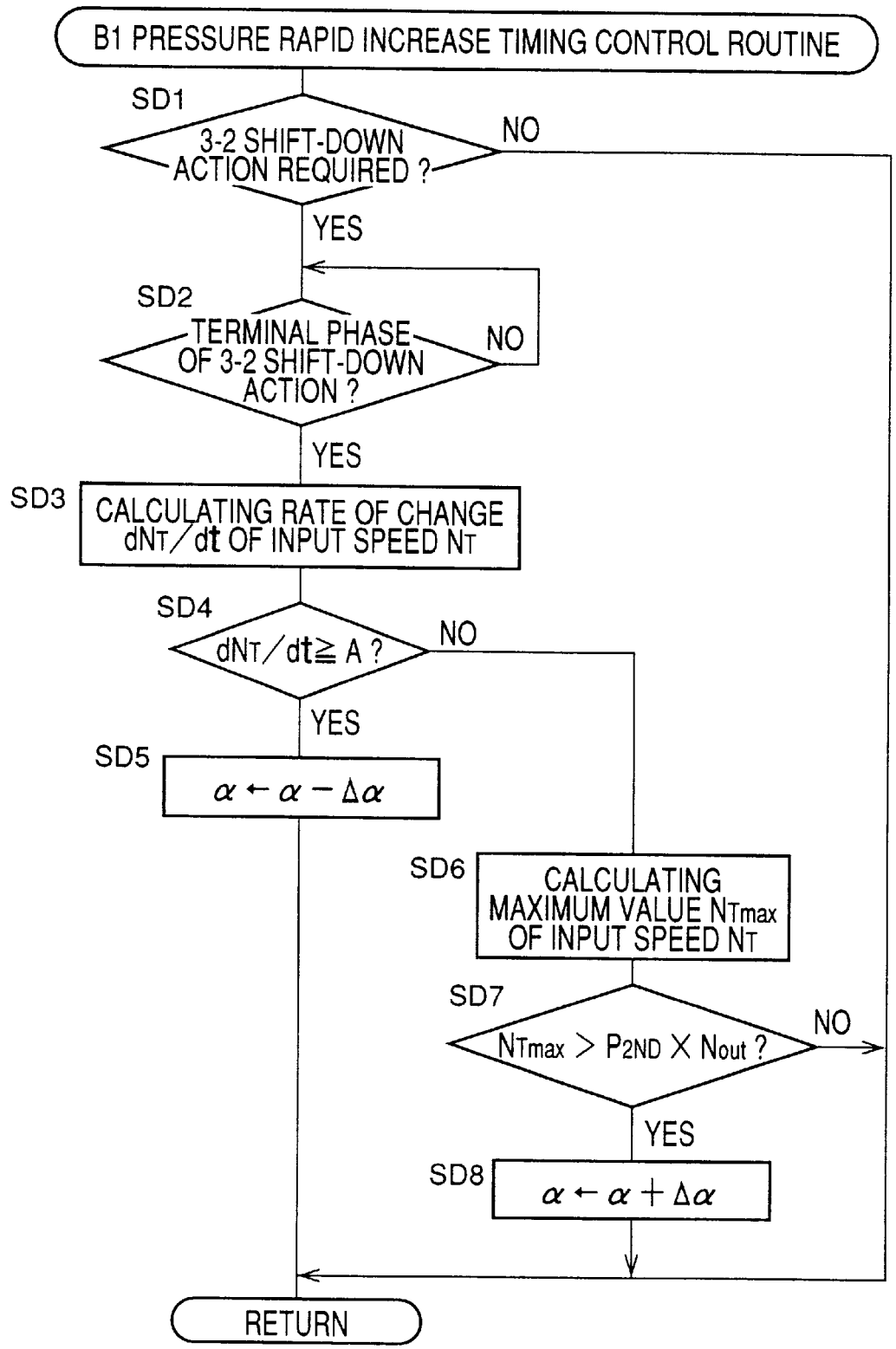
FIG. 21 is a flow chart illustrating a B1 pressure rapid increase timing control routine executed by the transmission controller of FIG. 18 for controlling a rapid increase timing of the pressure $P_{B1}$ of the brake B1.

The transmission controller 78 constructed according to a fourth embodiment of the present invention has functional means as illustrated in the block diagram of FIG. 18, and is adapted to execute a C2 pressure reducing routine illustrated in the flow chart of FIG. 19, a B1 pressure increasing routine illustrated in the flow chart of FIG. 20, and a B1 pressure rapid increase timing control routine illustrated in the flow chart of FIG. 21. These routines of FIGS. 19–21 are executed when the automatic transmission 14 is shifted down from the third-speed position "3rd" to the second-speed position "2nd". The C2 pressure reducing routine of FIG. 19 is executed to reduce the pressure $P_{C2}$ of the clutch C2, and the B1 pressure increasing routine of FIG. 20 is executed to increase the pressure $P_{B1}$ of the brake B1 while the B1 pressure rapid increase timing control routine of FIG. 21 is executed to control the timing of increasing the pressure $P_{B1}$.

The transmission controller 78 is adapted to control the automatic transmission 14 upon its 3–2 shift-down action which is achieved by engaging the brake Bi while releasing the clutch C2. This 3–2 shift-down action is an example of a so-called "clutch-to-clutch shifting action" which is achieved by engaging one of two hydraulically operated frictional coupling devices while releasing the other frictional coupling device. The present fourth embodiment is different from the first embodiment of FIGS. 5–10, in that the releasing pressure control means 130 is adapted to control the releasing action of the clutch C2, and in that the transmission controller 78 also includes input speed change rate determining means 160, maximum input speed determining means 161, reference speed learning compensation means 162, terminal shift-down phase monitoring means 163, third continuous pressure reduction means 164, and engaging pressure control means 166. The following description relates primarily to these means 160–166.

The input speed change rate determining means 160 is adapted to determine a rate of change of the input speed. of the automatic transmission 14 after the initiation of the 3–2 shift-down action, namely, a rate of change $dN_T/dt$ of the speed $N_T$ of the turbine impeller 24 after the initiation of the 3–2 shift-down action, on the basis of the speed $N_T$ which is detected from time to time by the turbine speed sensor 75. The maximum input speed determining means 161 is adapted to determine a maximum value $N_{Tmax}$ of the input speed $N_T$ of the automatic transmission 14 after the initiation of the 3–2 shift-down action, on the basis of the speed $N_T$ detected by the turbine speed sensor 75.

The reference speed learning compensation means 162 is adapted to effect learning compensation of a reference speed $(\rho_{2ND} \times N_{OUT} - \alpha)$ on the basis of the rate of change $dN_T/dt$ of the transmission input speed $N_T$ determined by the input speed change rate determining means 160, so as to prevent an excessive tie-up of the clutch C2 and the brake B1 and an excessive overshoot of the turbine speed $N_T$ (transmission input speed $N_T$) during the 3–2 shift-down action. The reference speed $(P_{2ND} \times N_{OUT} - \alpha)$ is used by the terminal shift-down phase monitoring means 163 (which will be described), to determine whether the 3–2 shift-down action has entered a terminal phase (indicated at point "t3" in FIG. 22). The excessive tie-up of the clutch C2 and Brake B1 takes place if the amount of overlap of simultaneous partial engagements of the clutch C2 and brake B1 is excessively large, while the excessive overshoot of the turbine speed $N_T$ takes place if the amount of overlap is excessively small.

The terminal shift-down phase monitoring means 163 is adapted to determine whether the input speed $N_T$ of the automatic transmission 14 has reached or increased to the predetermined reference speed $(\rho_{2ND} \times N_{OUT} - \alpha)$, which is compensated by the reference speed learning compensation means 161. If an affirmative decision is obtained by the monitoring means 163, it means that the 3–2 shift-down action is in the terminal phase a given time prior to the moment of completion of the 3–2 shift-down action. The value $(\rho_{2ND} \times N_{OUT})$ represents the input speed of the automatic transmission 14 after completion of the 3–2 shift-down action, that is, the speed $N_{OUT}$ of the counter shaft 44 multiplied by the speed ratio $\rho_{2ND}$ of the second-speed position "2nd". The value $\alpha$ which is subtracted from the transmission input speed $(\rho_{2ND} \times N_{OUT})$ after the 3–2 shift-down action to obtain the reference speed $(\rho_{2ND} \times N_{OUT} - \alpha)$ is a speed value which basically corresponds to a time between the moment at which the pressure $P_{B1}$ is rapidly increased and the moment of completion of the 3–2 shift-down action (completion of the engaging action of the brake B1). The value $\alpha$ is determined so that the completion of the 3–2 shift-down action coincides with the completion of the engaging action of the brake B1, that is, so that the input speed $N_T$ coincides with the speed ($\rho_{2ND} \times N_{OUT}$) after completion of the 3–2 shift-down action.

Figure 22:
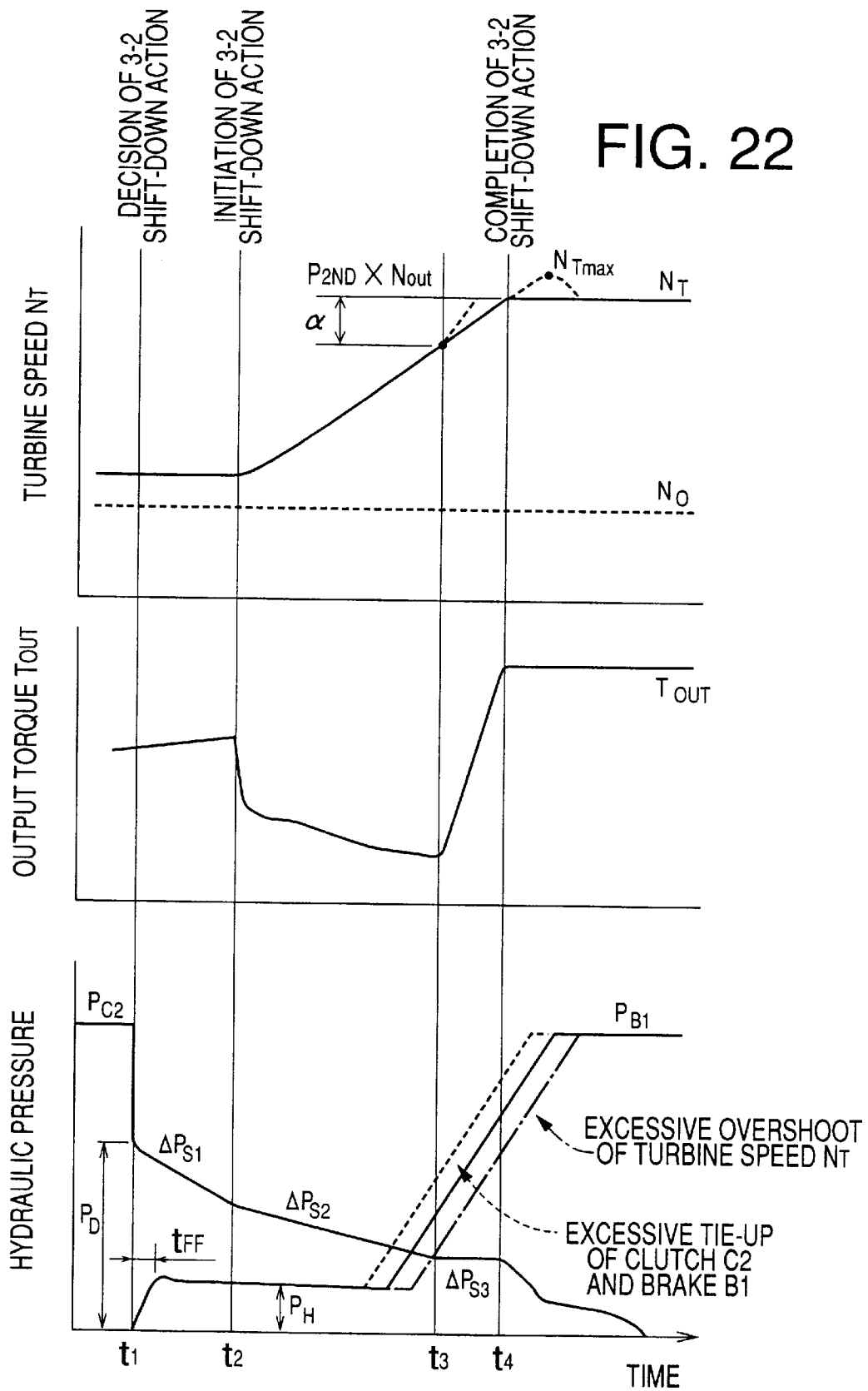
FIG. 22 is a time chart indicating changes of turbine speed $N_T$, automatic transmission output torque $T_{OUT}$ and the pressures $P_{C2}$ and $P_{B1}$ of the clutch C1 and brake B1, in the embodiment of FIG. 18.
Figure 23:
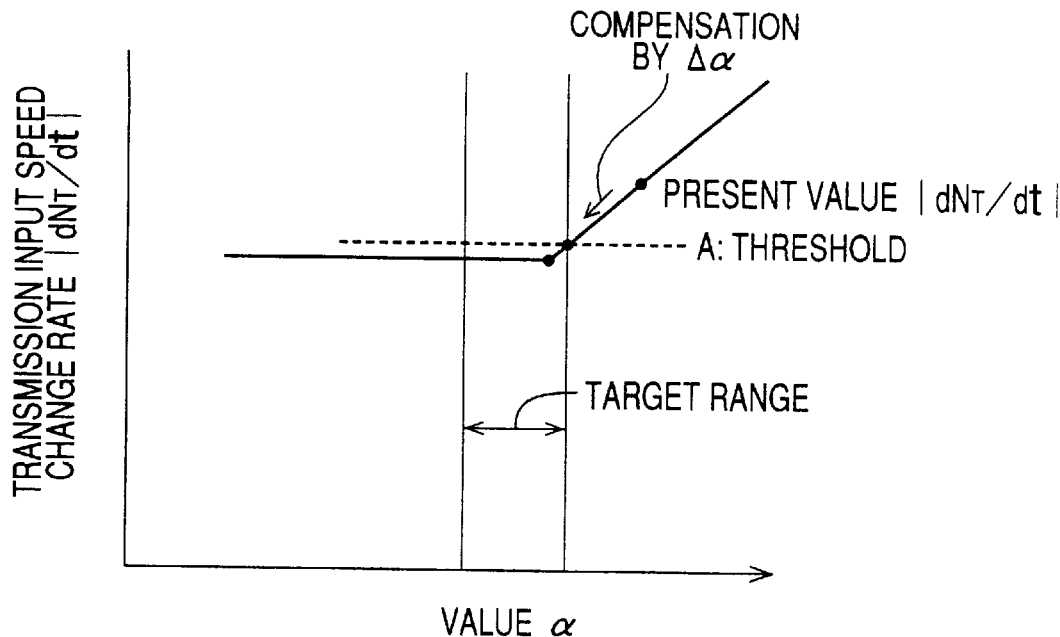
FIG. 23 is a view for explaining learning compensation of synchronization estimating value $\alpha$ included in a shift completion determining reference value ($\rho_{2ND} \times N_{OUT} - \alpha$), on the basis of input shaft speed change rate $dN_T/dt$, in the embodiment of FIG. 18.
Figure 24:
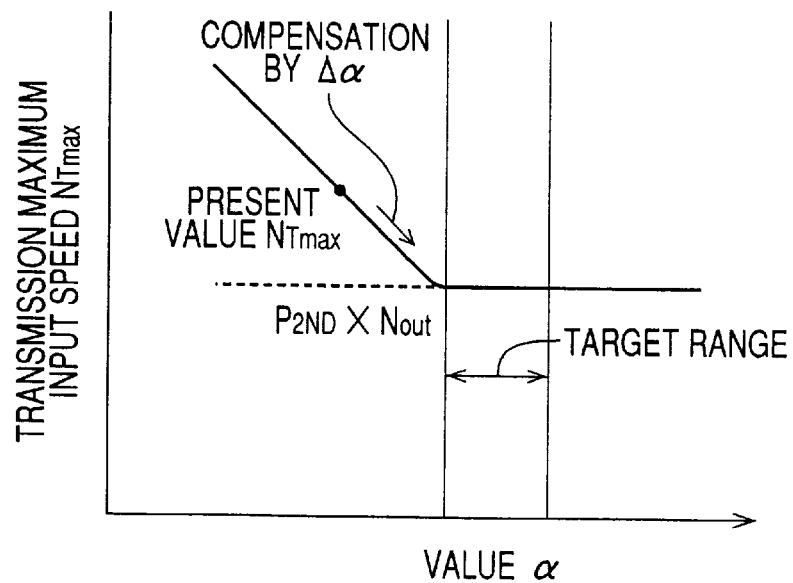
FIG. 24 is a view for explaining learning compensation of the synchronization estimating value $\alpha$ on the basis of maximum input shaft speed $N_{Tmax}$, in the embodiment of FIG. 18.

The releasing pressure control means 130 for controlling the releasing action of the clutch C3 during the 3–2 shift-down action is adapted to control the pressure $P_{C2}$ of the clutch C2 as indicated in the lowermost graph of FIG. 22. This releasing pressure control means 130 further incorporates third continuous pressure reduction means 164, which is adapted to continuously reduce the pressure $P_{C2}$ of the clutch C2 at a predetermined third reduction rate $\Delta P_{S3}$ after the terminal phase of the shift-down action is determined or detected by the terminal shift-down phase monitoring means 163, as indicated in FIG. 22. The third reduction rate $\Delta P_{S3}$ is lower than a predetermined second reduction rate $\Delta P_{S2}$ at which the pressure $P_{C2}$ is continuously reduced by the second continuous pressure reduction means 138 and which is lower than a predetermined first reduction rate $\Delta P_{S1}$ at which the pressure $P_{C2}$ is continuously reduced by the first continuous pressure reduction means 134.

The engaging pressure control means 166 for controlling the engaging action of the brake B1 during the 3–2 shift-down action is adapted to control the pressure $P_{B1}$ of the brake B1 as also indicated in the lowermost graph of FIG. 22. This engaging pressure control means 166 incorporates initial pressure increasing means 167, pressure holding means 168 and rapid pressure increase means 169. The initial pressure increasing means 167 is adapted to rapidly fill the engaging chamber of the brake B1 with the working fluid, by operating the solenoid-operated valve S1 in a duty-controlled manner in a relatively short fast-fill period $t_{FF}$, at a duty-ratio which permits the pressure $P_{B1}$ to be increased to a level which is 60–70% of the maximum value. The pressure holding means 168 is adapted to hold the pressure $P_{B1}$ at a predetermined level $P_H$ which is slightly lower than a level at which the engaging action of the brake B3 is initiated. The rapid pressure increase means 169 is operated upon determination of the terminal phase of the 3–2 shift-down action by the terminal shift-down phase monitoring means 163, that is, at the point of time "t" indicated in FIG. 22, to rapidly increase the pressure $P_{B1}$ from the level $P_H$ to the maximum pressure. It will be understood that the input speed change rate determining means 160, reference speed learning compensation means 162 and terminal shift-down phase monitoring means 163 cooperate to also function as rapid pressure increase timing control means corresponding to the rapid pressure increase timing control routine of FIG. 21, for controlling the timing of rapidly increasing the pressure $P_{B1}$ of the brake B1.

The C2 pressure reducing routine of FIG. 19 is initiated with step SB1 to determine whether the automatic transmission 14 should be shifted down from the third-speed position "3rd" to the second-speed position "2nd". This determination is effected by determining whether the point defined by the detected throttle opening angle θ and vehicle speed V has moved across a stored predetermined 3–2 shift-down boundary line which is a relationship between the throttle opening angle θ and running speed V. Alternatively, the determination in step SB1 is effected by determining whether the shift lever 72 is operated from the DRIVE position "D" to the LOW position "L". If a negative decision (NO) is obtained in step SB1, one cycle of execution of the routine of FIG. 19 is terminated. If an affirmative decision (YES) is obtained in step SB1, the control flow goes to step SB2 corresponding to the input torque determining means 144 and rapid pressure reduction amount determining means 146.

Step SB2 corresponds to steps SA2 through SA5 of the first embodiment of FIG. 10. In this step SB2, the output $T_E$ of the engine 10 is first calculated on the basis of the detected engine speed $N_E$ and throttle opening angle θ and according to the stored predetermined relationship of FIG. 7. Then, the torque ratio or speed ratio "t" of the torque converter 12 is calculated on the basis of the speed ratio "e"=$N_T/N_E$ of the torque converter 12 and according to the stored predetermined relationship of FIG. 8. Subsequently, the input torque $T_I$ of the automatic transmission 14 is calculated by multiplying the engine torque $T_E$ by the calculated torque ratio "t". Finally, the pressure level $P_D$ to which the pressure $P_{C2}$ is rapidly reduced by the rapid pressure reduction means 132 is calculated on the basis of the input torque $T_I$ and according to the stored predetermined relationship of FIG. 9.

Step SB2 is followed by step SB3 corresponding to the rapid pressure reduction means 321, to rapidly reduce the pressure $P_{C2}$ of the clutch C2 to the pressure level $P_D$, as indicated at point "t1" in FIG. 22.

Step SB2 is followed by step SB4 corresponding to the first continuous pressure reduction means 134, to continuously reduce the pressure $P_{C2}$ from the level $P_D$ at the first reduction rate $\Delta P_{S1}$. Then, the control flow goes to step SB5 corresponding to the shift-down action initiation monitoring means 136, to determine whether the 3–2 shift-down action has been substantially initiated. This determination is effected by determining whether the input speed of the automatic transmission 14 (speed $N_T$ of the turbine impeller 24) has started to increase. If a negative decision (NO) is obtained in step SB5, the control flow goes back to step SB4. The pressure $P_{C2}$ is continuously reduced at the reduction rate $\Delta P_{S1}$ until an affirmative decision (YES) is obtained in step SB5.

When the affirmative decision (YES) is obtained in step SB5, the control flow goes to step SB6 corresponding to the second continuous pressure reduction means 138, to initiate continuous reduction of the pressure $P_{C2}$ at the second reduction rate $\Delta P_{S2}$ lower than the first reduction rate $\Delta P_{S1}$, as indicated at point "t2" in FIG. 22. Then, the control flow goes to step SB7 corresponding to the terminal shift-down phase monitoring means 163, to determine whether the 3–2 shift-down action has entered the terminal phase. This determination is effected by determining whether the input speed of the automatic transmission 14 (speed $N_T$ of the turbine impeller 24) has increased to the predetermined reference speed ($\rho_{2ND} \times N_{OUT} - \alpha$). If a negative decision (NO) is obtained in step SB7, the control flow goes back to step SB6. The pressure $P_{C2}$ is continuously reduced at the second reduction rate $\Delta P_{S2}$ until an affirmative decision (YES) is obtained in step SB7.

When the affirmative decision (YES) is obtained in step SB7, the control flow goes to step SB8 corresponding to the third continuous pressure reduction means 164, to start continuous reduction of the pressure $P_{C2}$ at the third reduction rate $\Delta P_{S3}$ lower than the second reduction rate $\Delta P_{S2}$, as indicated at point "t3" in FIG. 22. The third reduction rate $\Delta P_{S3}$ is determined to be low enough to prevent a shifting shock of the automatic transmission 14.

Step SB8 is followed by step SB9 corresponding to the shift-down action completion monitoring means 150, to determine whether the 3–2 shift-down action is completed or terminated. This determination is effected by determining whether the input speed of the automatic transmission 14 (speed $N_T$ of the turbine impeller 24) has been increased to the input speed ($\rho_{2ND} \times N_{OUT}$) after completion of the 3–2 shift-down action, that is, the output speed $N_{OUT}$ multiplied by the speed ratio $\rho_{2ND}$ of the second-speed position "2nd" of the automatic transmission 14. If a negative decision (NO) is obtained in step SB9, the control flow goes back to step SB8. The pressure $P_{C2}$ is continuously reduced at the third reduction rate $\Delta P_{S3}$ until an affirmative decision (YES) is obtained in step SB9.

When the affirmative decision (YES) is obtained in step SB9, the control flow goes to step SB10 corresponding to the fully releasing means 142, to reduce the pressure $P_{C2}$ to the atmospheric pressure, as indicated at point "t3" in FIG. 22.

The B1 pressure increasing routine of FIG. 20 is initiated with step SC1 similar to step SB1, to determine whether the 3–2 shift-down action is required. If a negative decision (NO) is obtained in step SC1, one cycle of execution of the routine of FIG. 20 is terminated. If an affirmative decision (YES) is obtained in step SC1, the control flow goes to step SC2 corresponding to the initial pressure increasing means 167, to rapidly fill the engaging chamber of the brake B1 with the working fluid, by operating the solenoid-operated valve S1 in the duty-controlled manner in the relatively short fast-fill period $t_{FF}$ at a duty-ratio which permits the pressure $P_{B1}$ to be increased to a level which is 60–70% of the maximum value. Step SC2 is followed by step SC3 corresponding to the pressure holding means 168, to hold the pressure $P_{B1}$ of the brake B1 at the predetermined level $P_H$ which is lower than the level at which the engaging action of the brake B1 is initiated.

Step SC3 is followed by step SC4 corresponding to the terminal shift-down phase monitoring means 163, to determine whether the 3–2 shift-down action has entered the terminal phase. This determination is effected in the same manner as described above with respect to step SB7. If a negative decision (NO) is obtained in step SC4, the control flow goes to step SC3, so that the pressure $P_{B1}$ is held at the level $P_H$ until an affirmative decision (YES) is obtained in step SC4. If the affirmative decision (YES) is obtained in step SC4, the control flow goes to step SC5 corresponding to the rapid pressure increase means 169, to rapidly increase the pressure $P_{B1}$ to its maximum value, as indicated at point "t3" in FIG. 22.

The B1 pressure rapid increase timing control routine of FIG. 21 is initiated with step SD1 similar to step SB1, to determine whether the 3–2 shift-down action is required. If a negative decision (NO) is obtained in step SD1, one cycle of execution of the routine of FIG. 21 is terminated. If an affirmative decision (YES) is obtained in step SD1, the control flow goes to step SD2 corresponding to the terminal shift-down phase monitoring means 163, to determine whether the 3–2 shift-down action has entered the terminal phase. This determination is effected in the same manner as described above with respect to steps SB7 and SC4. Step SD2 is repeatedly implemented until an affirmative decision (YES) is obtained in step SD2. When the affirmative decision is obtained in step SD2, the control flow goes to step SD3 corresponding to the input speed change rate determining means 160, to determine the rate of change of the input speed of the automatic transmission 14, that is, the rate of change $dN_T/dt$ of the turbine impeller speed $N_T$, on the basis of the speed $N_T$ detected from time to time by the turbine speed sensor 75.

Then, the control flow goes to steps SD4 through SD8 corresponding to the reference speed learning compensation means 162, to compensate the reference speed $(\rho_{2ND} \times N_{OUT} - \alpha)$ used in step SC4 of the routine of FIG. 20. Step SD4 is provided to determine whether the rate of change $dN_T/dt$ of the turbine impeller speed $N_T$ is equal to or higher than a threshold value A. This threshold value A is determined by experiments, so as to detect an excessive tie-up of the clutch C2 and brake B1 (excessive amount of overlap of simultaneous partial engagements of the clutch C2 and brake B1). If an affirmative decision (YES) is obtained in step SD4, the control flow goes to step SD5 to update the value $\alpha$ used in the reference speed $(\rho_{2ND} \times N_{OUT} - \alpha)$, by subtracting a predetermined decrement value $\Delta\alpha$ from the present value $\alpha$.

If a negative decision (NO) is obtained in step SD4, on the other hand, the control flow goes to step SD6 corresponding to the maximum input speed determining means 161, to determine the maximum or peak value $N_{Tmax}$ of the input speed $N_T$ of the automatic transmission 14. Step SD6 is followed by step SD7 to determine whether the maximum value $N_{Tmax}$ is higher than the speed $(\rho_{2ND} \times N_{OUT})$ after completion of the 3–2 shift-down action. If an affirmative decision (YES) is obtained in step SD7, the control flow goes to step SD8 to update the value $\alpha$ by adding a predetermined increment value $\Delta\alpha$ to the present value $\alpha$. If a negative decision (No) is obtained in step SD7, one cycle of execution of the routine of FIG. 21 is terminated, without updating the value $\alpha$.

The affirmative decision (YES) is obtained in step SD4 with the rate of change $dN_T/dt$ of the transmission input speed $N_T$ being excessively high as indicated by broken line in FIG. 22, if the clutch C2 and the brake B1 has an excessive amount of tie-up due to an excessive amount of simultaneous partial engagements of the clutch C2 and brake B1 during the 3–2 shift-down action, as also indicated by broken line in FIG. 22. In this case, the value $\alpha$ is decremented in step SD5, so that the value $\alpha$ is reduced to fall within a target or desired range indicated in FIG. 23. Accordingly, the reference speed $(\rho_{2ND} \times N_{OUT} - \alpha)$ is increased in the next control cycle, whereby the point of time "t3" at which the terminal phase of the 3–2 shift-down action is detected is accordingly deferred, so that the point of time at which the pressure $P_{B1}$ is rapidly increased is accordingly deferred as indicated by solid line in FIG. 22, for minimizing the tie-up tendency in the next control cycle.

The affirmative decision (YES) is obtained in step SD7 with the maximum value $N_{Tmax}$ exceeding the value $\rho_{2ND} \times N_{OUT}$ as indicated by one-dot chain line in FIG. 22, if the speed $N_T$ has an excessive amount of overshoot due to an insufficient amount of simultaneous partial engagements of the clutch C2 and brake B1 during the 3–2 shift-down action, as also indicated by one-dot chain line in FIG. 22. In this case, the value $\alpha$ is increased to fall within a target or desired range indicated in FIG. 24. Accordingly, the reference speed $(\rho_{2ND} \times N_{OUT} - \alpha)$ is reduced in the next control cycle, whereby the point of time "t3" at which the terminal phase of the 3–2 shift-down action is detected is accordingly advanced, so that the point of time at which the pressure $P_{B1}$ is rapidly increased is accordingly advanced as indicated by the solid line in FIG. 22, for minimizing the overshoot tendency in the next control cycle.

The control apparatus according to this fourth embodiment of FIGS. 18–24 uses: the rapid pressure reduction means 132 (step SB3) which is operated upon determination to effect the 3–2 shift-down action of the automatic transmission 14, for rapidly reducing the pressure $P_{C2}$ of the clutch C2 to the pressure level $P_D$ which is determined to be higher than a level at which the clutch C2 starts slipping; the first continuous pressure reduction means 134 (SB4) for continuously reducing the pressure $P_{C2}$ from the pressure level $P_D$ at the predetermined first rate $\Delta P_{S1}$; the second continuous pressure reduction means 138 (SB6) for continuously reducing the pressure $P_{C2}$ at the predetermined second rate $\Delta P_{S2}$ lower than the first rate $\Delta P_{S1}$, after the determination by the 3–2 shift-down action initiation monitoring means 136 (SB5) that the 3–2 shift-down action has been substantially initiated; and the third continuous pressure reduction means 164 (SB8) for continuously reducing the pressure $P_{C2}$ at the predetermined third rate $\Delta P_{S3}$ lower than the second rate $\Delta P_{S2}$, after the determination by the terminal shift-down phase monitoring means 163 (SB7) that the 3–2 shift-down action has entered the terminal phase. The present control apparatus is not only capable of shortening a delay time from the moment of determination to effect the 3–2 shift-down action to the moment of the substantial initiation of the 3–2 shift-down action, owing to the rapid reduction of the pressure $P_{C2}$ to the pressure level $P_D$, but also capable of reducing the shifting shock of the automatic transmission owing to a decrease in the rate of continuous reduction of the pressure $P_{B1}$ from the value $\Delta P_{S1}$ to the value $\Delta P_{S2}$ upon detection or determination of the substantial initiation of the 3–2 shift-down action and a further decrease from the value $\Delta P_{S2}$ to the value $\Delta P_{S3}$ upon detection of the terminal phase of the 3–2 shift-down action. In the present power transmission system wherein the automatic transmission 14 is controlled by the present control apparatus, the delay time is shorter, and the shifting shock is smaller, than in the power transmission system wherein the automatic transmission is controlled by a control apparatus adapted to reduce the pressure $P_{B1}$ at a constant rate during the 2–1 shift-down action.

The 3–2 shift-down action of the automatic transmission 14 is achieved by releasing the clutch C2 while engaging the brake B1. For permitting smooth simultaneous releasing of the clutch C2 and engaging of the brake B1, the present control apparatus includes the terminal shift-down phase monitoring means 163 (SC4) for determining or detecting the terminal phase of the 3–2 shift-down action, so that the continuous reduction of the pressure $P_{C2}$ of the clutch C2 at the third rate $\Delta P_{S3}$ by the third continuous pressure reduction means 164 (SB8) and the rapid increase of the pressure $P_{B1}$ of the brake B2 by the rapid pressure increase means 169 (SC5) to the maximum value are simultaneously initiated upon detection of the terminal phase of the 3–2 shift-down action.

The present control apparatus further includes the input speed change rate determining means 160 (SD3) for determining the rate of change $dN_T/dt$ of the input speed of the automatic transmission 14 in the terminal phase of the 3–2 shift-down action, and the reference speed learning compensation means 162 (SD5) for effecting learning compensation of the reference speed ($\rho_{2ND} \times N_{OUT} - \alpha$) on the basis of the determined rate of change $dN_T/dt$ of the transmission input speed, so as to prevent the change rate $dN_T/dt$ from exceeding the threshold A, that is, so as to prevent an excessive amount of tie-up of the clutch C2 and brake B1. According to this arrangement, the 3–2 shift-down action is not influenced by a chronological change of the operating characteristics of the brake B1 and a change in the temperature of the working oil used for the automatic transmission 14. Thus, the present arrangement assures a smooth increase of the torque of the automatic transmission in the terminal phase of the shift-down action, up to the desired value upon and after completion of the shift-down action, thereby making it possible to minimize the shifting shock of the automatic transmission.

The present control apparatus also includes the maximum input speed determining means 161 (SD6) for determining the maximum value $N_{Tmax}$ of the input speed $N_T$ of the automatic transmission 14 during the 3–2 shift-down action, so that the reference speed ($\rho_{2ND} \times N_{OUT} - \alpha$) is compensated by the reference speed learning compensation means 162 (SD8) on the basis of the determined maximum transmission input speed $N_{Tmax}$, so as to prevent the maximum speed $N_{Tmax}$ from exceeding the speed ($\rho_{2ND} \times N_{OUT}$), that is, so as to prevent an excessive amount of overshoot of the transmission input speed $N_T$. This arrangement is effective to improve the smoothness of the 3–2 shift-down action without the excessive overshoot, irrespective of the chronological change in the operating characteristics of the brake B1 and the temperature change of the working oil.

While the several presently preferred embodiments of this invention have been described in detail by reference to the accompanying drawings, the invention may be otherwise embodied.

Figure 5:
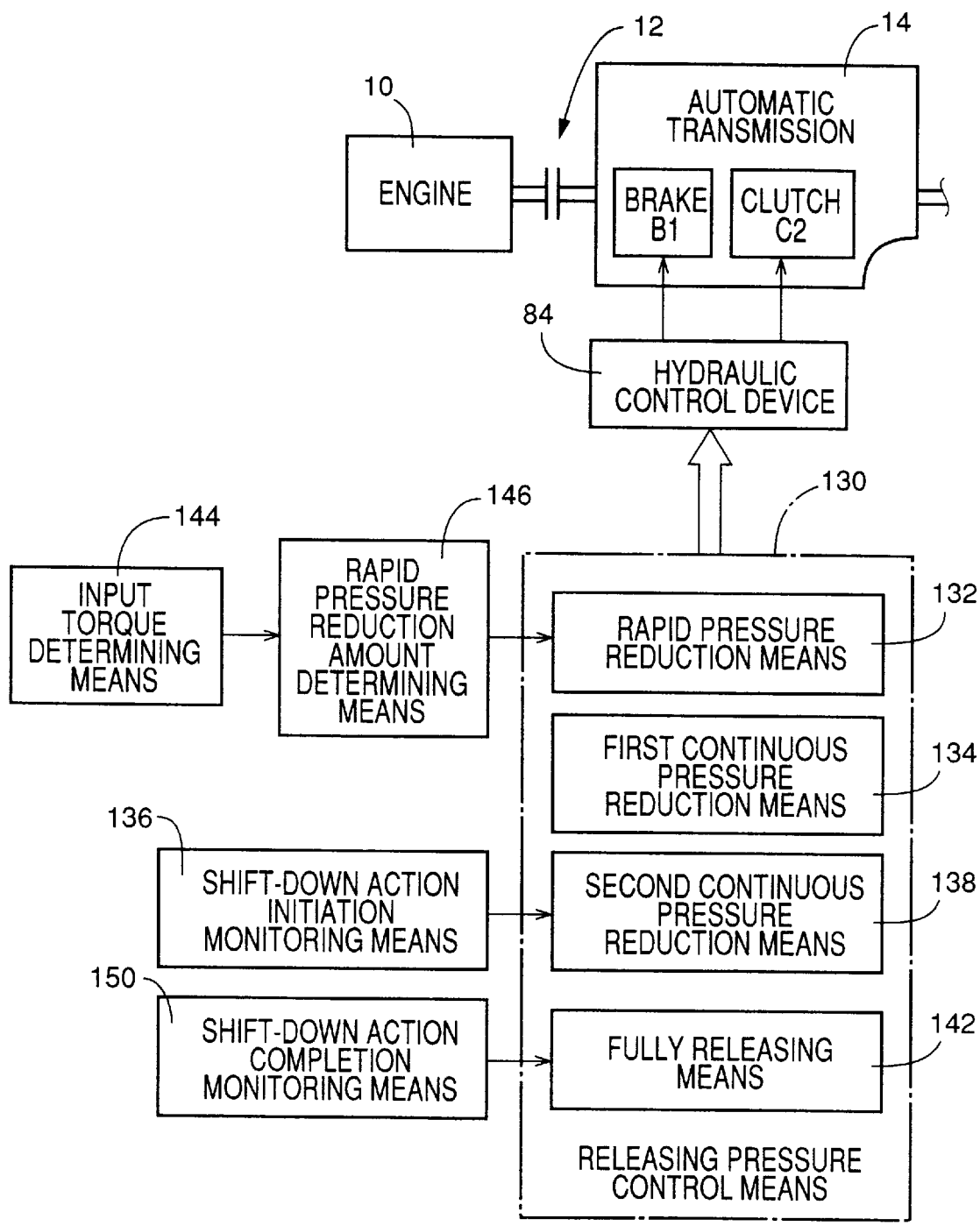
FIG. 5 is a block diagram illustrating various functional means of the transmission controller of FIG. 3.

For instance, the terminal shift-down phase monitoring means 163 and the third continuous pressure reduction means 164 provided in the fourth embodiment of FIG. 18 may be provided in the first, second and third embodiments of FIGS. 5, 11 and 15. Further, the fourth continuous pressure reduction means 135 provided in the second embodiment of FIG. 11 may be provided in the first, third and fourth embodiments of FIGS. 5, 15 and 18, so that the pressure $P_{C2}$ is reduced at the fourth reduction rate $\Delta P_{S4}$ when the input torque of the automatic transmission 14 is excessively large. Thus, the features provided in the various embodiments may be suitably combined.

While the first, second and third embodiments of FIGS. 5, 11 and 15 are adapted to control the pressure $P_{B1}$ of the brake B1 which is released to achieve the 2–1 shift-down action of the automatic transmission 14, these embodiments may be modified to control the pressure $P_{C2}$ of the clutch C2 which is released to achieve the 3–2 shift-down action. Similarly, the fourth embodiment of FIG. 18 adapted to control the pressure $P_{C2}$ of the clutch C2 which is released to achieve the 3–2 shift-down action may be modified to control the pressure $P_{B1}$ of the brake B1 which is released to achieve the 2–1 shift-down action.

The shift-down control routines illustrated in the flow charts of FIGS. 10, 12, 16 and 19–21 may be adapted to control the automatic transmission 14 only when it is shifted down with the accelerator pedal 50 being placed in a depressed state.

The first, second, third and fourth pressure reduction rates $\Delta P_{S1}$, $\Delta P_{S2}$, $\Delta P_{S3}$, $\Delta P_{S4}$ used in the illustrated embodiments may be fixed constants or may be changed as a function of a suitable parameter or parameters such as a temperature $T_{OIL}$ of the working fluid for the automatic transmission 14, the throttle opening angle θ, a rate of change dθ/dt of the throttle opening angle θ, and the speed ratio of the automatic transmission 14. In this case, the pressure reduction rates such as $\Delta P_{S1}$, $\Delta P_{S2}$ may be increased with a decrease of the temperature $T_{OIL}$, or with an increase in the throttle opening angle θ or its change rate dθ/dt, for improving the operating response of the control apparatus.

In the third embodiment of FIG. 15, the target value $T_{SAM}$ of the delay time $T_{SA}$ may be changed as a function of a suitable parameter or parameters, such as the oil temperature $T_{OIL}$, throttle opening angle θ, rate of change dθ/dt, and speed ratio of the transmission 14. IN this case, the target value $T_{SAM}$ may be decreased with a decrease in the temperature $T_{OIL}$, or with an increase in the throttle opening angle θ or its change rate dθ/dt.

Although the speed $N_T$ of the turbine impeller 24 is used as the input speed of the automatic transmission 14 in the illustrated embodiments, the input speed of the transmission 14 may be obtained on the basis of a rotating speed of any other rotary members rotating with the input shaft 22 of the transmission 14, for instance, the rotating speed of the clutch C1 or C2, the rotating speed of the crankshaft 18 during engagement of the lock-up clutch 32, or the rotating speed of the counter shaft 44 multiplied by the speed ratio of the transmission 14.

In the illustrated embodiments, the second continuous pressure reduction means 138 is activated to reduce the pressure reduction rate from the first rate $\Delta P_{S1}$ to the second rate $\Delta P_{S2}$ as soon as the shift-down action initiation monitoring means 136 has determined that the shift-down action has been initiated. However, a suitable delay time may be provided between the moment of determination of the initiation of the shift-down action and the moment of activation of the second continuous pressure reduction means.

The throttle opening angle $\theta$ and its rate of change $d\theta/dt$ may be replaced by other parameters such as the operating amount of the accelerator pedal 50 and its rate of change, an intake air quantity of the engine 10 and its rate of change, or an amount of fuel injection into the engine 10 and its rate of change.

It is to be understood that the present invention may be embodied with various other changes, modifications and improvements, which may occur to those skilled in the art, without departing from the spirit and scope of the invention defined in the following claims:

What is claimed is:

1. An apparatus for controlling an automatic transmission of a motor vehicle, wherein a shift-down action of the automatic transmission is achieved with a releasing action of a hydraulically operated frictional coupling device, said apparatus comprising:

rapid pressure reduction means for rapidly reducing a pressure of said hydraulically operated frictional coupling device to a predetermined pressure level, upon determination that said shift-down action of said automatic transmission should be effected, said predetermined pressure level being higher than a critical level at which said frictional coupling device starts slipping;

input torque determining means for determining an input torque of said automatic transmission; and rapid pressure reduction amount determining means for determining said predetermined pressure level, on the basis of said input torque of said automatic transmission determined by said input torque determining means.

2. An apparatus according to claim 1, wherein said shift-down action of said automatic transmission is achieved by said releasing action of said hydraulically operated frictional coupling device and an engaging action of a one-way clutch.

3. An apparatus according to claim 1, further comprising:

first continuous pressure reduction means for continuously reducing the pressure of said frictional coupling device from said predetermined level at a first reduction rate;

shift-down action initiation monitoring means for determining whether said frictional coupling device has started slipping, and determining that said shift-down action of said automatic transmission has been initiated, when said shift-down action initiation monitoring means determines that said frictional coupling device has started slipping; and second continuous pressure reduction means, operable upon determination of initiation of said shift-down action by said shift-down action initiation monitoring means, for continuously reducing said pressure of said frictional coupling device at a second reduction rate which is lower than said first reduction rate.

4. An apparatus according to claim 3, further comprising:

terminal shift-down phase monitoring means for determining a terminal phase of said shift-down action of said automatic transmission; and third continuous pressure reduction means, operable upon determination of said terminal phase of said shift-down action by said terminal shift-down phase monitoring means, for continuously reducing said pressure of said frictional coupling device at a third reduction rate lower than said second reduction rate.

5. An apparatus according to claim 1, further comprising:

delay time determining means for determining a delay time between a moment of said determination that said shift-down action of said automatic transmission should be effected, and a moment of initiation of said shift-down action; and learning compensation means for effecting learning compensation of said predetermined pressure level determined by said rapid pressure reduction amount determining means, such that said delay time determined by said delay time determining means coincides with a predetermined target value.

6. An apparatus for controlling an automatic transmission of a motor vehicle, wherein a shift-down action of the automatic transmission is achieved with a releasing action of a hydraulically operated frictional coupling device, said apparatus comprising:

rapid pressure reduction means for rapidly reducing a pressure of said hydraulically operated frictional coupling device to a predetermined pressure level, upon determination that said shift-down action of said automatic transmission should be effected, said predetermined pressure level being higher than a critical level at which said frictional coupling device starts slipping;

input torque change rate determining means for determining a rate of increase of an input torque of said automatic transmission; and rapid pressure reduction. amount determining means for determining said predetermined pressure level, on the basis of said rate of increase of said input torque of said automatic transmission determined by said input torque change rate determining means.

7. An apparatus according to claim 6, wherein said shift-down action of said automatic transmission is achieved by said releasing action of said hydraulically operated frictional coupling device and an engaging action of a one-way clutch.

8. An apparatus according to claim 6, further comprising:

first continuous pressure reduction means for continuously reducing the pressure of said frictional coupling device from said predetermined level at a first reduction rate;

shift-down action initiation monitoring means for determining whether said frictional coupling device has started slipping, and determining that said shift-down action of said automatic transmission has been initiated, when said shift-down action initiation monitoring means determines that said frictional coupling device has started slipping; and second continuous pressure reduction means, operable upon determination of initiation of said shift-down action by said shift-down action initiation monitoring means, for continuously reducing said pressure of said frictional coupling device at a second reduction rate which is lower than said first reduction rate.

9. An apparatus for controlling an automatic transmission of a motor vehicle, wherein a shift-down action of the automatic transmission is achieved with a releasing action of a hydraulically operated frictional coupling device, said apparatus comprising:

rapid pressure reduction means for rapidly reducing a pressure of said hydraulically operated frictional coupling device to a predetermined pressure level, upon determination that said shift-down action of said automatic transmission should be effected, said predetermined pressure level being higher than a critical level at which said frictional coupling device starts slipping;

delay time determining means for determining a delay time between a moment of said determination that said shift-down action of said automatic transmission should be effected, and a moment of initiation of said shift-down action; and learning compensation means for effecting learning compensation of said predetermined pressure level determined by said rapid pressure reduction amount determining means, such that said delay time determined by said delay time determining means coincides with a predetermined target value.

10. An apparatus according to claim 9, wherein said shift-down action of said automatic transmission is achieved by said releasing action of said hydraulically operated frictional coupling device and an engaging action of a one-way clutch.

11. An apparatus according to claim 9, further comprising:

input torque determining means for determining an input torque of said automatic transmission; and rapid pressure reduction amount determining means for determining said predetermined pressure level, on the basis of said input torque of said automatic transmission determined by said input torque determining means.

12. An apparatus according to claim 9, further comprising:

first continuous pressure reduction means for continuously reducing the pressure of said frictional coupling device from said predetermined level at a first reduction rate;

shift-down action initiation monitoring means for determining whether said frictional coupling device has started slipping, and determining that said shift-down action of said automatic transmission has been initiated, when said shift-down action initiation monitoring means determines that said frictional coupling device has started slipping; and second continuous pressure reduction means, operable upon determination of initiation of said shift-down action by said shift-down action initiation monitoring means, for continuously reducing said pressure of said frictional coupling device at a second reduction rate which is lower than said first reduction rate.

13. An apparatus for controlling an automatic transmission of a motor vehicle, wherein a shift-down action of the automatic transmission is achieved with a releasing action of a hydraulically operated frictional coupling device, said apparatus comprising:

rapid pressure reduction means for rapidly reducing a pressure of said hydraulically operated frictional coupling device to a predetermined pressure level, upon determination that said shift-down action of said automatic transmission should be effected, said predetermined pressure level being higher than a critical level at which said frictional coupling device starts slipping;

first continuous pressure reduction means for continuously reducing the pressure of said frictional coupling device from said predetermined level at a first reduction rate;

shift-down action initiation monitoring means for determining whether said frictional coupling device has started slipping, and determining that said shift-down action of said automatic transmission has been initiated, when said shift-down action initiation monitoring means determines that said frictional coupling device has started slipping; and second continuous pressure reduction means, operable upon determination of initiation of said shift-down action by said shift-down action initiation monitoring means, for continuously reducing said pressure of said frictional coupling device at a second reduction rate which is lower than said first reduction rate.

14. An apparatus according to claim 13, wherein said shift-down action of said automatic transmission is achieved by said releasing action of said hydraulically operated frictional coupling device and an engaging action of a one-way clutch.

15. An apparatus according to claim 13, wherein said shift-down action of said automatic transmission is achieved by said releasing action of said hydraulically operated frictional coupling device and an engaging action of another hydraulically operated frictional coupling device.

16. An apparatus according to claim 13, further comprising:

input torque determining means for determining an input torque of said automatic transmission; and rapid pressure reduction amount determining means for determining said predetermined pressure level, on the basis of said input torque of said automatic transmission determined by said input torque determining means.

17. An apparatus according to claim 13, further comprising:

terminal shift-down phase monitoring means for determining a terminal phase of said shift-down action of said automatic transmission; and third continuous pressure reduction means, operable upon determination of said terminal phase of said shift-down action by said terminal shift-down phase monitoring means, for continuously reducing said pressure of said frictional coupling device at a third reduction rate lower than said second reduction rate.

18. An apparatus according to claim 13, further comprising:

shift-down action completion monitoring means for determining whether said shift-down action of said automatic transmission is completed; and fully releasing means, operable when said shift-down action completion monitoring means determines that said shift-down action is completed, for terminating continuous reduction of the pressure of said frictional coupling device by said second continuous pressure reduction means, and reducing the pressure of said frictional coupling device to an atmospheric pressure.

19. An apparatus for controlling an automatic transmission of a motor vehicle, wherein a shift-down action of the automatic transmission is achieved with a releasing action of a hydraulically operated frictional coupling device, said apparatus comprising:

rapid pressure reduction means for rapidly reducing a pressure of said hydraulically operated frictional coupling device to a predetermined pressure level, upon determination that said shift-down action of said automatic transmission should be effected, said predetermined pressure level being higher than a critical level at which said frictional coupling device starts slipping;

first continuous pressure reduction means for continuously reducing the pressure of said frictional coupling device from said predetermined level at a first reduction rate;

shift-down action initiation monitoring means for determining whether said frictional coupling device has started slipping, and determining that said shift-down action of said automatic transmission has been initiated, when said shift-down action initiation monitoring means determines that said frictional coupling device has started slipping;

second continuous pressure reduction means, operable upon determination of initiation of said shift-down action by said shift-down action initiation monitoring means, for continuously reducing said pressure of said frictional coupling device at a second reduction rate which is lower than said first reduction rate;

terminal shift-down phase monitoring means for determining a terminal phase of said shift-down action of said automatic transmission; and third continuous pressure reduction means, operable upon determination of said terminal phase of said shift-down action by said terminal shift-down phase monitoring means, for continuously reducing said pressure of said frictional coupling device at a third reduction rate lower than said second reduction rate.

20. An apparatus according to claim 19, wherein said shift-down action of said automatic transmission is achieved by said releasing action of said hydraulically operated frictional coupling device and an engaging action of another hydraulically operated frictional coupling device.

21. An apparatus according to claim 19, further comprising:

input torque determining means for determining an input torque of said automatic transmission; and rapid pressure reduction amount determining means for determining said predetermined pressure level, on the basis of said input torque of said automatic transmission determined by said input torque determining means.

22. An apparatus according to claim 19, further comprising:

shift-down action completion monitoring means for determining whether said shift-down action of said automatic transmission is completed; and fully releasing means, operable when said shift-down action completion monitoring means determines that said shift-down action is completed, for terminating continuous reduction of the pressure of said frictional coupling device by said third continuous pressure reduction means, and reducing the pressure of said frictional coupling device to an atmospheric pressure.

23. An apparatus according to claim 19, wherein said shift-down action of said automatic transmission is achieved by said releasing action of said hydraulically operated frictional coupling device and an engaging action of another hydraulically operated frictional coupling device, said apparatus further comprising rapid pressure increase means for rapidly increasing the pressure of said another frictional coupling device when said terminal shift-down phase monitoring means determines said terminal phase of said shift-down action.

24. An apparatus according to claim 23, wherein said terminal shift-down phase monitoring means determines said terminal phase when an input speed of said automatic transmission has increased to a predetermined reference speed, said apparatus further comprising:

input speed change rate determining means for determining a rate of change of said input speed of said automatic transmission in said terminal phase of said shift-down action; and reference speed learning compensation means for effecting learning compensation of said reference speed on the basis of said rate of change of said input speed determined by said input speed change rate determining means.

* * * * *